(12) United States Patent
Nishimura et al.

(10) Patent No.: US 9,903,324 B2
(45) Date of Patent: Feb. 27, 2018

(54) ENGINE DEVICE

(71) Applicant: YANMAR CO., LTD., Osaka (JP)

(72) Inventors: Katsuhiro Nishimura, Osaka (JP); Sadao Kuwazuru, Osaka (JP); Kouichi Hirose, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 29 days.

(21) Appl. No.: 15/030,746

(22) PCT Filed: Oct. 22, 2014

(86) PCT No.: PCT/JP2014/078128
§ 371 (c)(1),
(2) Date: Apr. 20, 2016

(87) PCT Pub. No.: WO2015/064449
PCT Pub. Date: May 7, 2015

(65) Prior Publication Data
US 2016/0258396 A1    Sep. 8, 2016

(30) Foreign Application Priority Data

Oct. 28, 2013  (JP) ................. 2013-223650
Oct. 28, 2013  (JP) ................. 2013-223651

(51) Int. Cl.
*F02M 37/00* (2006.01)
*F02M 55/02* (2006.01)
(Continued)

(52) U.S. Cl.
CPC ......... *F02M 37/0064* (2013.01); *B63H 21/38* (2013.01); *F01M 5/002* (2013.01);
(Continued)

(58) Field of Classification Search
CPC .... F02B 61/04; F02B 43/10; F02B 2043/103; F02M 21/0284; F02M 35/112; F02M 35/165; F02M 37/0017
See application file for complete search history.

(56) References Cited

U.S. PATENT DOCUMENTS 4,214,560 A      7/1980  Nikly
5,517,972 A  *   5/1996  Stockner ................. F02B 75/22
                                                      123/496
(Continued)

FOREIGN PATENT DOCUMENTS

CA          686906 A       5/1964
EP          2511511 A1    10/2012
(Continued)

*Primary Examiner* — Long T Tran
(74) *Attorney, Agent, or Firm* — Norris McLaughlin & Marcus, P.A.

(57) ABSTRACT

An engine device, which employs various types of fuels, plural fuel pipes can compactly be disposed without being thermally affected by exhaust gas. In the engine device, a gas fuel pipe that supplies gas fuel to a gas injector, a fuel oil pipe that supplies liquid fuel to a main fuel injection valve are disposed to be divided on both sides of a row of head covers arranged in a line. In addition, in the engine device, an intake manifold that supplies air taken in by a main combustion chamber toward an intake valve extends in parallel to the row of head covers in a cylinder block, and the fuel gas pipe and the intake manifold are arranged on the same side of the row of head covers.

7 Claims, 17 Drawing Sheets

(51) Int. Cl.
  *F02M 35/16* (2006.01)
  *F02B 29/04* (2006.01)
  *F02M 21/02* (2006.01)
  *F02D 19/06* (2006.01)
  *F02M 63/02* (2006.01)
  *B63H 21/38* (2006.01)
  *F01M 5/00* (2006.01)
  *F01M 11/06* (2006.01)
  *F02B 43/10* (2006.01)
  *F02M 35/104* (2006.01)
  *F02B 61/04* (2006.01)
  *F02M 39/00* (2006.01)
  *F02M 39/02* (2006.01)

(52) U.S. Cl.
  CPC ....... *F01M 11/065* (2013.01); *F02B 29/0462* (2013.01); *F02B 43/10* (2013.01); *F02D 19/0647* (2013.01); *F02D 19/0657* (2013.01); *F02D 19/0692* (2013.01); *F02M 21/0203* (2013.01); *F02M 21/029* (2013.01); *F02M 35/104* (2013.01); *F02M 35/165* (2013.01); *F02M 55/02* (2013.01); *F02M 63/029* (2013.01); *F02B 61/04* (2013.01); *F02B 2043/103* (2013.01); *F02M 39/00* (2013.01); *F02M 39/02* (2013.01); *Y02T 10/146* (2013.01); *Y02T 10/32* (2013.01); *Y02T 10/36* (2013.01)

(56) References Cited

U.S. PATENT DOCUMENTS

| | | |
|---|---|---|
| 2003/0187565 A1 | 10/2003 | Wong |
| 2012/0037121 A1* | 2/2012 | Kajita ............... F02F 1/24 123/445 |
| 2013/0046452 A1 | 2/2013 | Moscherosch et al. |
| 2013/0206121 A1* | 8/2013 | Nishikawa ......... F02M 25/0754 123/568.13 |
| 2014/0090620 A1* | 4/2014 | Buck ............... F02F 7/0021 123/193.5 |
| 2015/0083083 A1* | 3/2015 | Maetani .............. F02M 39/00 123/470 |

FOREIGN PATENT DOCUMENTS

| | | |
|---|---|---|
| JP | 60-6066 | 1/1985 |
| JP | S6172821 A | 4/1986 |
| JP | 7-11983 | 1/1995 |
| JP | H07-011983 A | 1/1995 |
| JP | 2002-004899 | 1/2002 |
| JP | 2002-364482 A | 12/2002 |
| JP | 2005-113698 | 4/2005 |
| JP | 2005-113698 A | 4/2005 |
| JP | 2008-202545 | 9/2008 |
| JP | 2010-242559 | 10/2010 |

* cited by examiner

ENGINE DEVICE

TECHNICAL FIELD

The invention of the present application relates to a multifuel-used engine device capable of using any of gas fuels such as natural gas and liquid fuels such as heavy oil.

BACKGROUND OF THE INVENTION

Hitherto, for example, in vessels such as tankers and shipping vessels, and in land power generating facilities, diesel engines have been used as their driving sources. However, exhaust gas of a diesel engine contains a lot of nitrogen oxide, sulfur oxide, and particulate material, etc, which serve as toxic substances that hinder environment preservation. Accordingly, in recent years, as an engine as an alternative for the diesel engine, a gas engine that can reduce a generation amount of toxic substance, etc., have come into widespread use.

Further, as an engine that is a combination of diesel engine features and gas engine features, there has been provided (see patent document 1 and patent document 2) a dual fuel engine that use a premixing combustion method in which gas fuel (fuel gas), such as natural gas, is mixed with air, and is supplied and burnt in a combustion chamber, and a diffusion combustion method in which liquid fuel, such as heavy oil, is jetted and burnt in a combustion chamber.

PATENT DOCUMENTS

Patent document 1: Japanese Unexamined Patent Application Publication No. 2002-004899
Patent document 2: Japanese Unexamined Patent Application Publication No. 2008-202545

SUMMARY OF INVENTION

In a dual fuel engine, differently from the above diesel engine and gas engine, in order to use the diffusion combustion method and the premixing combustion method, two systems of fuel pipes are needed to supply each of liquid fuel and gas fuel. Accordingly, the dual fuel engine has a problem in that its piping structure is complicated compared with a diesel engine and a gas engine that have only one system of fuel pipes. In addition, since it is necessary to dispose an exhaust gas flow path that discharges exhaust gas after combustion, in the case of forming each system of fuel piping, it is necessary to configure the piping so that influence of exhaust heat caused by exhaust gas can be removed as much as possible.

To this end, it is a technical issue of the invention of the present invention to provide a multifuel-used engine device that has been improved on the basis of studying the above-described circumstances.

The invention is an engine device comprising: an intake valve that causes a main combustion chamber in a cylinder of an engine to take in air; an exhaust valve that causes the main combustion chamber to discharge combustion gas; a main fuel injection valve that jets and burns liquid fuel in the main combustion chamber; and a gas injector that mixes gas fuel with the air taken in by the main combustion chamber, wherein a gas fuel pipe that supplies the gas fuel to the gas injector and a liquid fuel pipe that supplies the liquid fuel to the main fuel injection valve are disposed to be divided on both sides of a row of head covers arranged in a line, and wherein an intake manifold that supplies the air taken in by the main combustion chamber toward the intake valve extends in parallel to the row of head covers in a cylinder block, and the gas fuel pipe and the intake manifold are arranged on the same side of the row of head covers.

The invention is the engine device, wherein an exhaust manifold that causes the combustion gas from the main combustion chamber extends in parallel to the row of head covers, and on the same side of the row of head covers, the exhaust manifold and the intake manifold are disposed to be divided above and below the gas fuel pipe.

The invention is the engine device, comprising a pilot fuel injection valve that jets an ignition flame in the main combustion chamber, wherein a pilot fuel pipe that supplies pilot fuel to the pilot fuel injection valve extends in parallel to the row of head covers, wherein above the cylinder block, at a position between the row of head covers and the exhaust manifold, a cooling water pipe extends in parallel to the row of head covers, and above the cooling water pipe, the pilot fuel pipe is supported.

The invention is the engine device, wherein the gas fuel pipe has a double pipe structure formed of an inner pipe that supplies the gas fuel toward the gas injector and an outer pipe into which the gas fuel flows from the gas injector.

The invention is the engine device, wherein on one side face, as the side of the gas fuel pipe, of the cylinder block, a lubricant oil cooler and a lubricant oil strainer are arranged in series, wherein at a position between the gas fuel pipe and the lubricant oil cooler, a first cooling water pipe that supplies cooling water to the lubricant oil cooler extends along the lubricant oil cooler, with the first cooling water pipe separated from one side face of the cylinder block, and wherein a second cooling water pipe connected to a cylinder head on the cylinder block extends in parallel to the row of head covers above the cylinder block at a position between the head covers and the fuel gas pipe.

The invention is the engine device, wherein on one end face of the cylinder block, which is perpendicular to an engine output shaft, at one side face side, as an outer circumferential side of the engine output shaft, of the cylinder block in which the lubricant oil cooler is disposed, a lubricant oil pump is disposed and supplies the lubricant oil cooler with lubricant oil sucked up by the lubricant oil pump.

According to the invention of the present invention, in an engine device comprising: an intake valve that causes a main combustion chamber in a cylinder of an engine to take in air; an exhaust valve that causes the main combustion chamber to discharge combustion gas; a main fuel injection valve that jets and burns liquid fuel in the main combustion chamber; and a gas injector that mixes gas fuel with the air taken in by the main combustion chamber, a gas fuel pipe that supplies the gas fuel to the gas injector and a liquid fuel pipe that supplies the liquid fuel to the main fuel injection valve are disposed to be divided on both sides of a row of head covers arranged in a line, and wherein an intake manifold that supplies the air taken in by the main combustion chamber toward the intake valve extends in parallel to the row of head covers in a cylinder block, and the gas fuel pipe and the intake manifold are arranged on the same side of the row of head covers. Thus, by disposing the gas fuel pipe and the liquid fuel pipe in a divided manner, both can compactly be disposed around the cylinder head, with space saved. In addition, since the gas fuel pipe and the intake manifold can be disposed on the same side of the row of head covers, a piping distance between the gas injector and the gas fuel pipe, which are disposed on the intake side, can be shortened, thus reducing pressure loss in the gas fuel pipe.

According to the invention, an exhaust manifold that causes the combustion gas from the main combustion chamber extends in parallel to the row of head covers, and on the same side of the row of head covers, the exhaust manifold and the intake manifold are disposed to be divided above and below the gas fuel pipe. Thus, the gas fuel pipe and the exhaust manifold can collectively be disposed on the same side of the cylinder head. Therefore, on the other side of the cylinder head, the fuel injection pump that supplies high pressure liquid fuel by pressure to the main fuel injection valve, and the liquid fuel pipe can collectively be disposed.

According to the invention, the engine device comprises a pilot fuel injection valve that jets an ignition flame in the main combustion chamber, and a pilot fuel pipe that supplies pilot fuel to the pilot fuel injection valve extends in parallel to the row of head covers, and above the cylinder block, at a position between the row of head covers and the exhaust manifold, a cooling water pipe extends in parallel to the row of head covers, and above the cooling water pipe, the pilot fuel pipe is supported. Thus, the pilot fuel pipe can be prevented from having a temperature increased by high temperature exhaust gas temperature. Therefore, the pilot fuel pipe can be disposed on the side of the exhaust manifold, which comes to have a high temperature, so that individual pipes can compactly collectively be disposed.

According to the invention, the gas fuel pipe has a double pipe structure formed of an inner pipe that supplies the gas fuel toward the gas injector and an outer pipe into which the gas fuel flows from the gas injector. Thus, the gas fuel left in the gas injector can be returned to a fuel source side such as a gas valve unit, so that the pressure of the gas fuel pipe can be maintained to be constant.

According to the invention, on one side face, as the side of the gas fuel pipe, of the cylinder block, a lubricant oil cooler and a lubricant oil strainer are arranged in series, wherein at a position between the gas fuel pipe and the lubricant oil cooler, a first cooling water pipe that supplies cooling water to the lubricant oil cooler extends along the lubricant oil cooler, with the first cooling water pipe separated from one side face of the cylinder block, and wherein a second cooling water pipe connected to a cylinder head on the cylinder block extends in parallel to the row of head covers above the cylinder block at a position between the head covers and the fuel gas pipe. Thus, by disposing the gas fuel pipe and the liquid fuel pipe in a divided manner, both can be disposed with space saved.

In addition, by disposing the lubricant oil cooler and the lubricant oil strainer on the engine side face as the gas fuel pipe side, and disposing the first cooling water pipe that supplies cooling water to the lubricant oil cooler on the same side face, lubricant oil circulation systems can collectively be disposed, and their maintenance operations can be simplified. Further, also the second cooling water pipe is disposed above the engine device on the same side of the first cooling water pipe, cooling water pipes to be disposed outside the engine device can collectively be disposed, and their lengths can be shortened.

According to the invention, on one end face of the cylinder block, which is perpendicular to an engine output shaft, at one side face side, as an outer circumferential side of the engine output shaft, of the cylinder block in which the lubricant oil cooler is disposed, a lubricant oil pump is disposed and supplies the lubricant oil cooler with lubricant oil sucked up by the lubricant oil pump. Thus, the lubricant oil pump and the lubricant oil cooler can be connected by a short piping. Accordingly, the engine device can compactly be configured, and mounting of the lubricant oil system can be simplified.

DESCRIPTION OF THE PREFERRED EMBODIMENTS

An embodiment in which the invention of the present invention is embodied will be described below on the basis of drawings in a case where the invention of the present invention is applied to a pair of propelling and power generating mechanisms installed in as two-shaft two-axis vessel.

Figure 1:
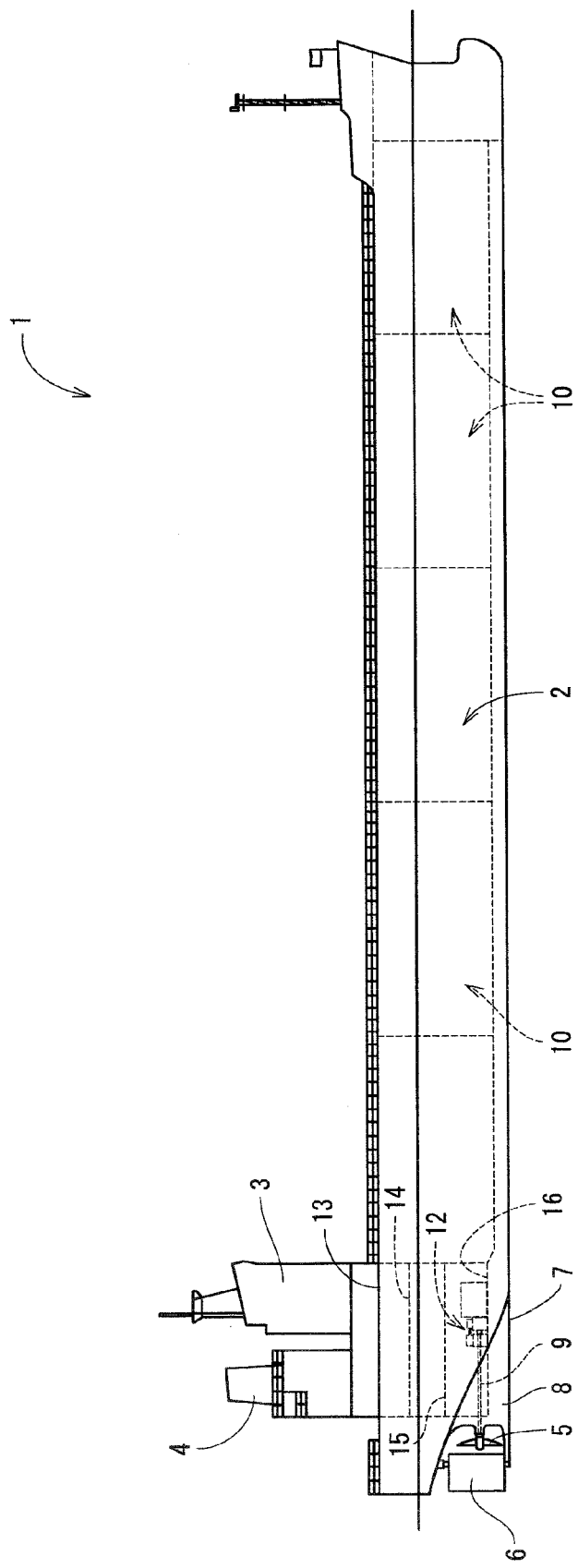
FIG. 1 is an entire side view of a vessel according to an embodiment of the present invention.
Figure 2:
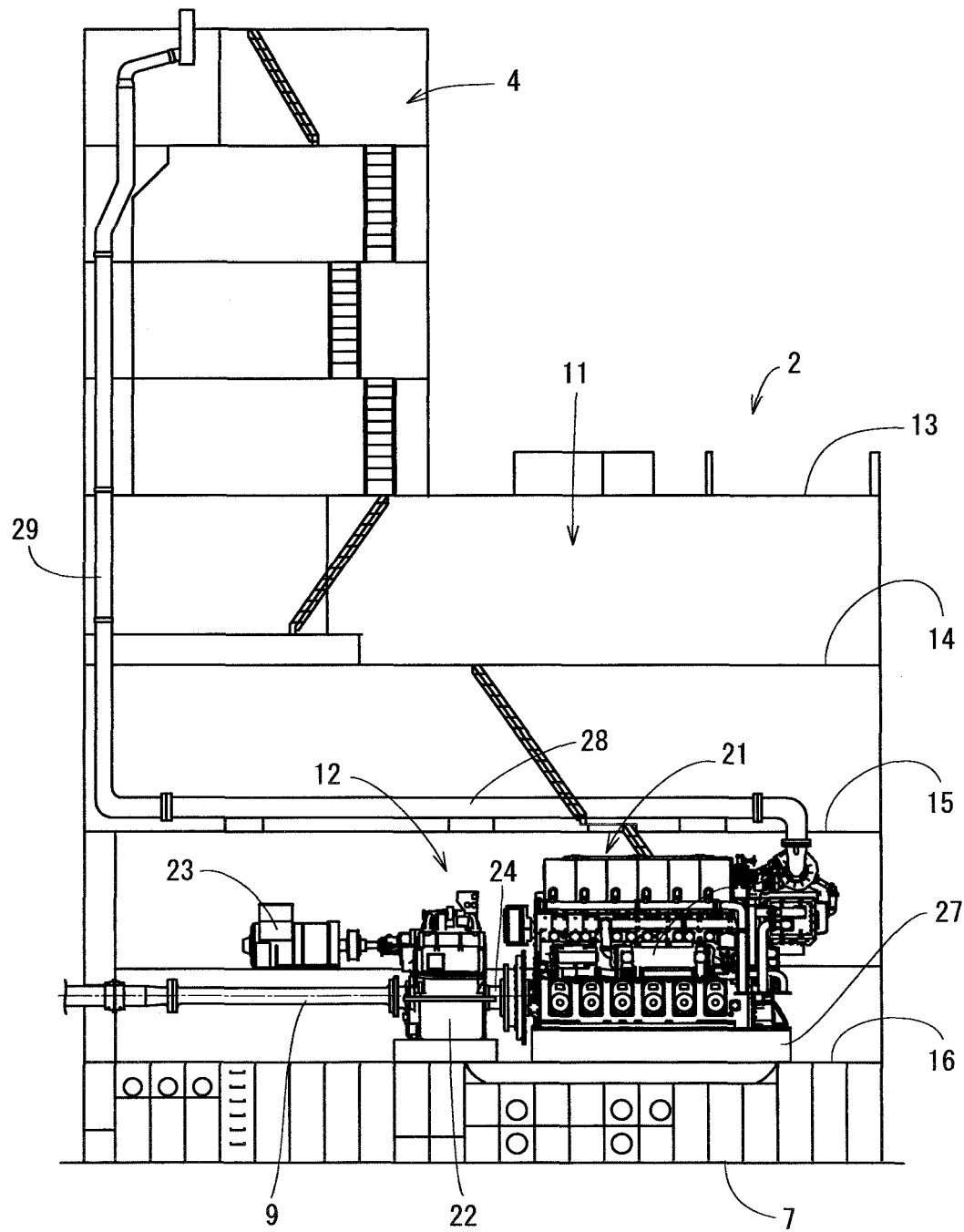
FIG. 2 is a side face sectional view of an engine room.
Figure 3:
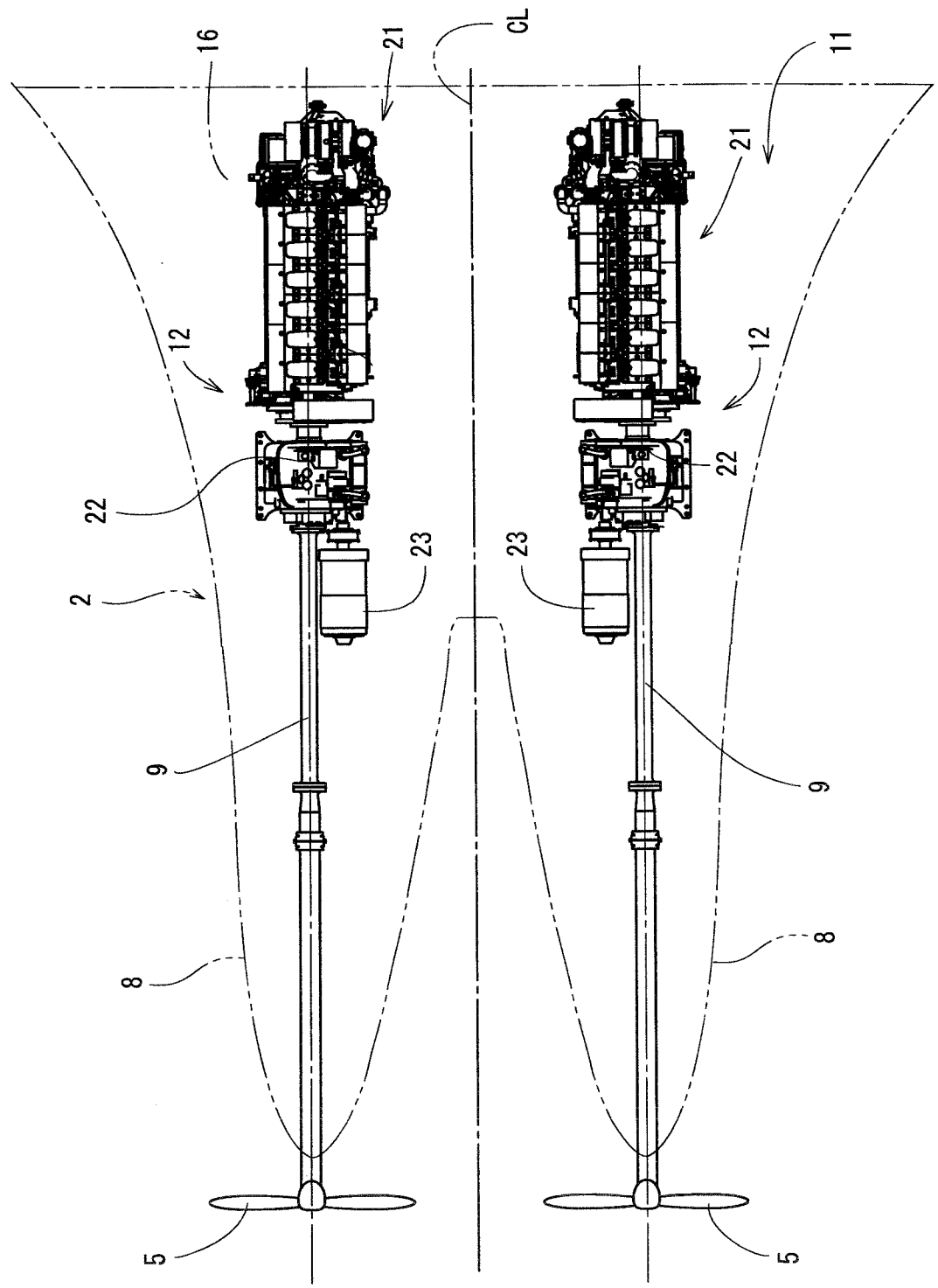
FIG. 3 is a plan explanatory view of the engine room.

First, an outline of a vessel will be described. As illustrated in FIGS. 1 to 3, a vessel 1 according to the embodiment includes a vessel body 2, a cabin 3 (bridge) provided on a stern side of the vessel body 2, as funnel 4 disposed behind the cabin 3, and a pair of propellers 5 and a rudder 6 that are provided at a rear lower portion of the vessel body 2. In this case, a pair of skegs 8 are integrally formed on a vessel bottom 7 at the rudder side. A propelling shaft 9 that rotationally drives the propeller 5 is pivotally supported by each skeg 8. The skegs 8 are symmetrically formed with reference to a vessel body central line CL (see FIG. 3) that divides the vessel body 2 in its lateral width direction. In other words, in the first embodiment, twin skegs are employed as a stern shape of the vessel body 2.

The vessel body 2 has therein holds 10 provided at its bow side and in its center portion. The vessel body 2 has therein an engine room 11 provided at its stern side. In the engine room 11, a pair of propelling and power generating mechanisms 12 that are both driving sources for the propellers 5 and power supply sources for the vessel 1 are provided to be symmetrically divided with the vessel body central line CL interposed therebetween. Each propeller 5 is rotationally driven by rotational power transmitted from each propelling and power generating mechanism 12 to each propelling shaft 9. The inside of the engine room 11 is vertically portioned by an upper deck 13, a second deck 14, a third deck 15, and an inner bottom plate 16. The propelling and power generating mechanisms 12 in the first embodiment are installed on the inner bottom plate 16, which is at a lowermost stage of the engine room 11. Note that the holds 10 are divided into plural compartments although not illustrated in detail.

As illustrated in FIGS. 2 and 3, each propelling and power generating mechanism 12 is a combination of a medium speed engine device 21 (dual fuel engine in the embodiment) that is a driving source for the propeller 5, a speed reducer 22 that transmits power of the engine device 21 to the propelling shaft 9, and a shaft drive generator 23 that generates electric power with the power of the engine device 21. Here, the "medium speed" engine means an engine that rotates at a rotational speed of about 500 to 1000 rotations per minute. Incidentally, a "low speed" engine is driven at a rotational speed of 500 rotations or less per minutes, and a "high speed" engine is driven at a rotational speed of 1000 rotations or more per minute. The engine device 21 in the embodiment is configured to be driven at a constant speed within a medium speed range (about 700 to 750 rotations per minute).

The engine device 21 includes a cylinder block 25 including an engine output shaft 24 (crank shaft), and a cylinder head 26 mounted on the cylinder block 25. A base board 27 is installed directly on the inner bottom plate 16, which is at the lowermost stage in the engine room 11, or installed above the inner bottom plate 16 via a vibration-proof body (not illustrated). The cylinder block 25 of the engine device 21 is mounted on the base board 27. The output shaft 24 extends to be oriented in a longitudinal length direction. In other words, the engine device 21 is disposed in the engine room 11 in a state in which the output shaft 24 is directed in the longitudinal length direction of the vessel body 2.

The speed reducer 22 and the shaft-driven generator 23 are disposed closer to the stern side than the engine device 21. A rear end side of the engine output shaft 24 protrudes from a rear face side of the engine device 21. The speed reducer 22 is linked to the rear end side of the engine output shaft so as to transmit power. The shaft-driven generator 23 is disposed opposite the engine device 21, with the speed reducer 22 interposed therebetween. The engine device 21, the speed reducer 22, and the shaft-driven generator 23 are sequentially arranged in the order given from the front side inside the engine room 11. In this case, the speed reducer 22 and the shaft-driven generator 23 are arranged in the skeg 8 at the stern side or in the vicinity thereof. Accordingly, the engine device 21 can be disposed closer to the stern side as much as possible despite restriction of the paddock line 40 of the vessel 1, thus contributing to compactification of the engine room 11.

The propelling shaft 9 is provided at a power transmission downstream side of the speed reducer 22. An outer shape of the speed reducer 22 protrudes more downwardly from the engine device 21 and the shaft-driven generator 23. A front end side of the propelling shaft 9 is linked to a rear face side of the protruding portion so as to be able to transmit power. The engine output shaft 24 (shaft core line) and the propelling shaft 9 are coaxially positioned in planar view. The propelling shaft 9 extends in the longitudinal length direction of the vessel body 2 in a state in which the propelling shaft 9 axially differs in a vertical direction with respect to the engine output shaft 24 (shaft core line). In this case, the propelling shaft 9 is positioned to be lower than the shaft-driven generator 23 and the engine output shaft 24 (shaft core line) in planar view and to be near the inner bottom plate 16. In other words, the shaft-driven generator 23 and the propelling shaft 9 are vertically divided, and do not interfere with each other. Accordingly, each propelling and power generating mechanism 12 can be made compact.

The constant power of the engine device 21 is transmitted from the rear end side of the engine output shaft 24 to branch to the shaft-driven generator 23 and the propelling shaft 9 via the speed reducer 22. Part of the constant power of the engine device 21 is transmitted to the propelling shaft 9 after being reduced in speed by the speed reducer 22 to a rotational speed of, for example, 100 to 120 rotations per minute, or its vicinity. The reduced speed power from the speed reducer 22 rotationally drives the propeller 5. Note that as the propeller 5, a variable pitch propeller in which the vessel speed is adjustable by altering the blade angle of propeller blades is employed. In addition, the part of the constant power of the engine device 21 is transmitted to a PTO shaft that is pivotally supported so as to be rotatable by the speed reducer 22 after being increased in speed to a rotational speed of, for example, 1200 to 1800 rotations per minute. A rear end side of the PTO shaft of the speed reducer 22 is linked to the shaft-driven generator 23 so as to be able to transmit power, and the shaft-driven generator 23 is driven to generate electric power on the basis of rotational power from the speed reducer 22. Generated electric power generated by driving of the shaft-driven generator 23 is supplied to electrical systems in the vessel body 2.

An intake path (not illustrated) for taking in air and an exhaust path 28 for discharging exhaust gas are connected to the engine device 21. Air taken in through the intake path is sent into each cylinder (into each intake stroke cylinder) of the engine device 21. In addition, since the number of the engine devices 21 is two, there are two exhaust paths 28. Each exhaust path 28 is connected to an extended path 29. The extended path 29 is configured to extend to the funnel 4 so as to directly communicate with the exterior. Exhaust gas from each engine device 21 is released outside the vessel 1 via each exhaust path 28 and the extended path 29.

As is clear from the foregoing description, there are provided one pair of the propelling and power generating mechanisms 12 that are each a combination of the engine device 21, the speed reducer 22 that transmits power of the engine device 21 to the propelling shaft 9 that rotationally drives the propeller 5 for propelling the vessel, and the shaft-driven generator 23 that generates electric power by the power of the engine device 21. The one pair of the propelling and power generating mechanisms 12 are disposed in the engine room 11 in the vessel body 2 to be symmetrically divided with the vessel body central line CL interposed therebetween. Thus, compared with a conventional structure in which plural engines (a main engine and an auxiliary engine) are disposed, engine installation space in the engine room 11 can be reduced.

Accordingly, by shortening the longitudinal length of the engine room 11, the engine room 11 can be constructed to be compact. As a result, it is easy to reserve hold spaces (spaces other than the engine room 11) in the vessel body 2. By driving the two propellers 5, an increase in propulsion efficiency of the vessel 1 is achieved.

Further, since the two engine devices 21, which are main engines, are provided, even if, for example, one engine device 21 becomes unable to rotate due to malfunction, the other engine device 21 enables navigation, thus ensuring redundancy of a vessel engine device and consequently the vessel 1. Moreover, as described above, since the engine devices 21 perform rotational driving of the propellers 5 and driving of the shaft-driven generators 23, during normal navigation, either shaft-driven generator 23 can be used as an auxiliary. Therefore, for example, in a case where electric power supply is stopped due to malfunction of one engine device 21 or one shaft-driven generator 23, by activating the other shaft-driven generator 23, power feeding may be resumed establishing frequency and voltage. In addition, in a case where during navigation with only one engine device 21, the one engine device 21 is stopped, by activating the other engine device 21, which is at a stop, consequently driving the shaft-driven generator 23, which corresponds thereto, power feeding may be resumed establishing frequency and voltage.

Next, the dual fuel engine device 21, which is used as a main engine in the above vessel 1, will be described with reference to the drawings. The dual fuel engine device 21 (hereinafter referred to simply as the "engine device 21") is driven by alternatively selecting a premixing combustion method in which fuel gas, such as natural gas, is mixed into air and is burnt, and a diffusion combustion method in which liquid fuel (fuel oil), such as heavy oil, is diffused and burnt. Note that in the following description, the front, rear, right, and left positional relations in the engine device 21 are designated such that a side connected to the speed reducer 22 is used as a rear side.

Figure 4:
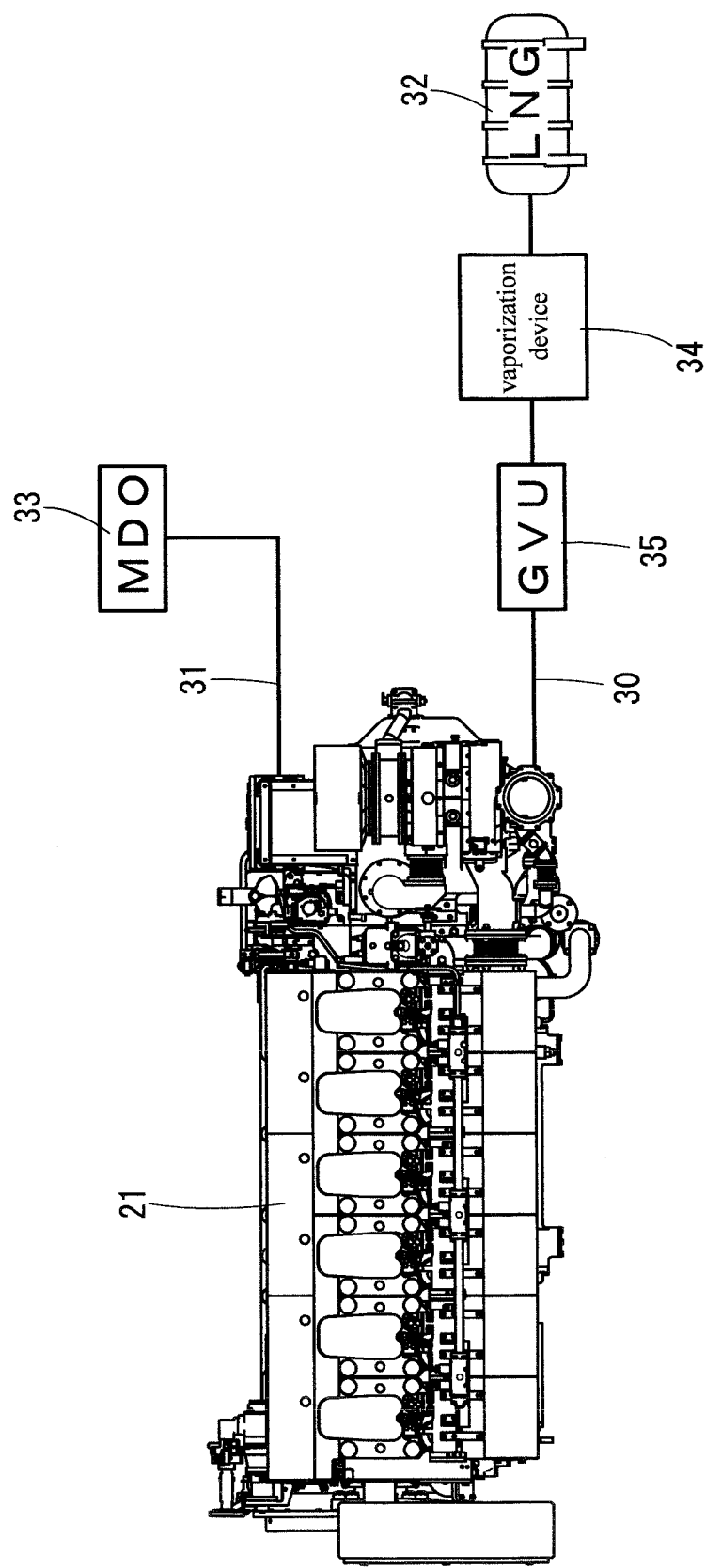
FIG. 4 is a schematic explanatory diagram.
Figure 5:
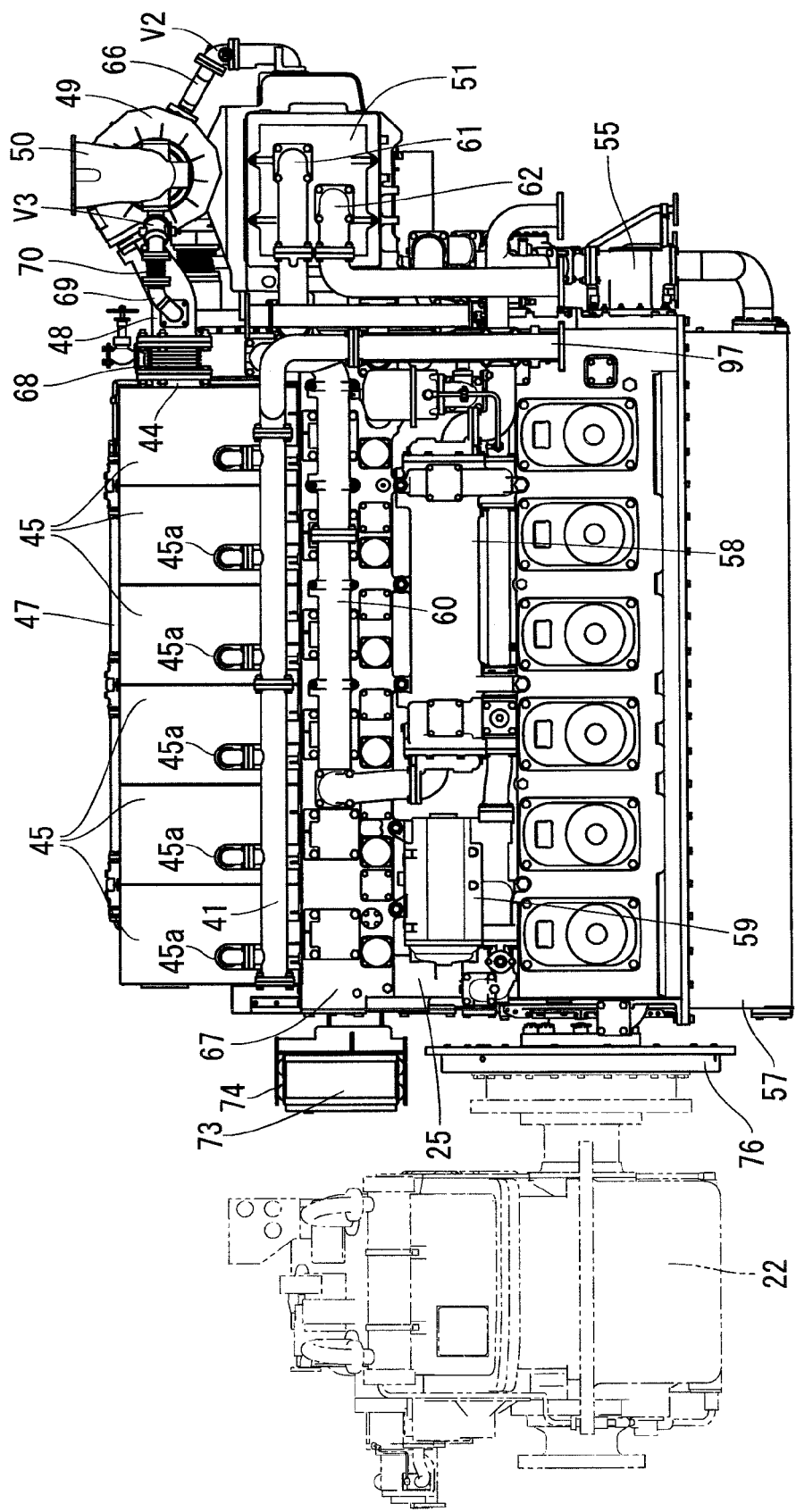
FIG. 5 is a right side face view of an engine device according to an embodiment of the present invention.

As illustrated in FIG. 4, the engine device 21 is supplied with fuel from two systems of fuel supply paths 30 and 31. A gas fuel tank 32 is connected to one fuel supply path 30, and a liquid fuel tank 33 is connected to the other fuel supply path 31. In other words, regarding the engine device 21, fuel gas is supplied from the fuel supply path 30 to the engine device 21, while fuel oil is supplied from the fuel supply path 31 to the engine device 21. The fuel supply path 30 includes the gas fuel tank 32, which stores gas fuel in liquefied state, a vaporization device 34 that evaporates liquefied fuel (fuel gas) of the gas fuel tank 32, and a gas valve unit 35 that adjusts a supply amount of the gas fuel from the vaporization device 34 to the engine device 21. In other words, the fuel supply path 30 is configured such that the vaporization device 34 and the gas valve unit 35 are arranged in order from the gas fuel tank 32 to the engine device 21.

As illustrated in FIGS. 5 to 12, the engine device 21 includes the output shaft 24 in the cylinder block 25 mounted on the base board 27 (see FIG. 2), and the cylinder head 26, in which plural head covers 40 are longitudinally arranged in a line, is mounted on the cylinder block 25. In the engine device 21, on a right side face of the cylinder head 26, a gas manifold (gas fuel pipe) 41 extends in parallel to the row of the head covers 40, while on a left side face of the cylinder block 25, a side cover 43 that covers the fuel oil pipe 42 extending in parallel to the row of the head covers 40 is disposed. In addition, above the gas manifold 41, an exhaust manifold (exhaust flow path) 44, which is described later, extends in parallel to the row of the head covers 40, and the outer circumference of the exhaust manifold 44 is covered with a thermal insulating cover 45.

Between the row of the head covers 40 and the thermal insulating cover 45, an on-cylinder-head cooling water pipe 46 that links to a cooling water path in the cylinder head 26 extends in parallel to the row of the head covers 40. Above the cooling water pipe 46, a common rail (pilot fuel pipe) 47 that supplies pilot fuel based on light oil, etc., extends in parallel to the row of the head covers 40 similarly to the cooling water pipe 46. Then, the cooling water pipe 46 is supported by being linked to the cylinder heads 26, and the common rail 47 is supported by being linked to the cooling water pipe 46. In addition, the thermal insulating cover 45 is supported by being linked to the cooling water pipe 46 and the cylinder heads 26.

A front end (exhaust outlet side) of the exhaust manifold 44 is connected to a supercharger 49 via an exhaust relay pipe 48. Therefore, exhaust gas discharged through the exhaust manifold 44 flows into a turbine 49a of the supercharger 49 via an exhaust relay pipe 48, whereby the turbine 49a is rotated to rotate a compressor 49b, which is coaxial to the turbine 49a. The supercharger 49 is disposed at a front end upper side of the engine device 21, and has the turbine 49a on the right side thereof and the compressor 49b on the left side thereof. Also, an exhaust outlet pipe 50 is disposed on the right side of the supercharger 49, and is linked to an exhaust outlet of the turbine 49a causing the exhaust path 28 (see FIG. 2) to discharge the exhaust gas from the turbine 49a.

Below the supercharger 49, an intercooler 51 that cools compressed air by the compressor 49b of the supercharger 49 is disposed. In other words, at the front end side of the cylinder block 25, the intercooler 51 is provided, and the supercharger 49 is placed on the intercooler 51. At a lateral middle layer position of the supercharger 49, an air discharge outlet of the compressor 49b is provided so as to be open backward (the side of the cylinder block 25). On the other hand, in an upper face of the intercooler 51, an air intake inlet that is open upward. Through this air intake inlet, compressed air discharged from the compressor 49b flows into the intercooler 51. Also, the air discharge outlet of the compressor 49b and the air intake inlet of the intercooler 51 are caused to communicate with each other by an intake relay pipe 52.

On the front end face (front face) of the engine device 21, a cooling water pump 53, a pilot fuel pump 54, a lubricant oil pump 55, and a fuel oil pump 56 are separately disposed at the outer circumferential side of the output shaft 24. Then, the cooling water pump 53 and the fuel oil pump 56 are separately vertically disposed closer to the left side face, and the pilot fuel pump 54 and the lubricant oil pump 55 are separately vertically disposed to the right face. In addition, the front end portion of the engine device 21 is provided with a rotation transmission mechanism (not illustrated) that transmits rotational power of the output shaft 24. This transmits the rotational power of the output shaft 24 via the rotation transmission mechanism, whereby the cooling water pump 53, the pilot fuel pump 54, the lubricant oil pump 55, and the fuel oil pump 56 that are provided at the outer circumferential side of the output shaft 24 are also caused to individually rotate. Further, in the cylinder block 25, a cam shaft (not illustrated) that uses its longitudinal as an axial direction is pivotally supported above the cooling water pump 53, so that the rotational power of the output shaft 24 is transmitted through the rotation transmission mechanism to also rotate the cam shaft.

Below the cylinder block 25, the oil pan 57 is provided, and in this oil pan 57, lubricant oil that flows in the cylinder block 25 accumulates. The lubricant oil pump 55 is connected to the oil pan 57 by its lower suction inlet via the lubricant oil pipe, and sucks the lubricant oil that accumulates in the oil pan 57. In addition, an upper discharge outlet of the lubricant oil pump 55 is connected to a lubricant oil inlet of the lubricant oil cooler 58 via the lubricant oil pipe, thus supplying the lubricant oil sucked from the oil pan 57 to the lubricant oil cooler 58. The lubricant oil 58 has its front used as a lubricant oil inlet, and its rear used as a lubricant oil outlet, and the lubricant oil outlet is linked to the lubricant oil strainer 59 via the lubricant oil pipe. The lubricant oil strainer 59 has its front used as a lubricant oil inlet, and its rear used as a lubricant oil outlet, and the lubricant oil outlet is connected to the cylinder block 25. Therefore, after the lubricant oil sent from the lubricant oil pump 55 is cooled by the lubricant oil cooler 58, it is purified with the lubricant oil strainer 59.

The lubricant oil cooler 58 and the lubricant oil strainer 59 are separately fixed to the right side face of the cylinder block 25. Also, the lubricant oil cooler 58 and the lubricant oil strainer 59 are longitudinally disposed in series on the right side face of the cylinder block 25 so that the lubricant oil cooler 58 is forward (the side of the lubricant oil pump 55). In addition, a cylinder block right cooling water pipe 60 that extends longitudinally is disposed at a position between the gas manifold 41 and the lubricant oil cooler 58 so as to be separated from the right side face of the cylinder block 25. The cooling water pipe 60 extends to a position between the lubricant oil cooler 58 and the lubricant oil strainer 59 so as to be along the intercooler 51 from the front of the cylinder block 25.

In addition, the cooling water pipe 60 that extends along the gas manifold 41 is linked to an intercooler discharge-side cooling water pipe 61 discharged from the intercooler 51, and supplies cooling water that has flowed out from the intercooler 61 to the lubricant oil cooler 58. Note that the intercooler discharge-side cooling water pipe 61 and a water supply side cooling water pipe 62, which are vertically disposed on a right side face of the intercooler 61, are separately inserted into the intercooler 61, and the intercooler 61 cools compressed air from the compressor 49b of the supercharger 49.

In the supercharger 49, the compressor 49h and the turbine 49a, which are laterally disposed so as to be divided, are pivotally supported to be coaxial. The compressor 49b rotates on the basis of rotation of the turbine 49a, which is introduced from the exhaust manifold 44 through the exhaust relay pipe 49. In addition, the supercharger 49 includes, at the left side of the compressor 49b, which serves as a fresh air intake side, an intake filter 63 and a fresh air passage pipe 64 that connects the intake filter 63 and the compressor 49b. This causes the compressor 49b to rotate in synchronization with the turbine 49a, whereby outside air (air) sucked by the intake filter 63 is introduced into the compressor 49b through the supercharger 49. Also, the compressor 49b compresses the air sucked from the left side, and discharges the compressed air to the intake relay pipe 52, which is disposed at the rear side.

The intake relay pipe 52 is connected to a discharge outlet behind the compressor 49b, with its upper front opened, via a bellows pipe 65, while being connected to an intake inlet on the upper face of the intercooler 51, with its lower side opened. In addition, the intercooler 51 is connected to one end of an intake bypass pipe 66 at a branch port provided on a ventilation path on the front face, so that part of the compressed air cooled by the intercooler 51 is discharged into the intake bypass pipe 66. The other end of the intake bypass pipe 66 is connected to a branch port provided on a front face of the fresh air passage pipe 64, so that part of the compressed air cooled by the intercooler 51 is refluxed into the fresh air passage pipe 64 through the intake filter 63 and joins the outside air from the intake filter 63. In addition, the intake bypass pipe 66 has an intake bypass valve V2 disposed at its midway portion.

The compressed air from the compressor 49b flows into the intercooler 51 from its rear right side through the intake relay pipe 52, so that the compressed air is cooled on the basis of heat exchange action with the cooling water supplied from the water supply pipe 62. Inside the intercooler 51, the compressed air cooled by a left chamber flows through a front ventilation path to be introduced into a right chamber, and is subsequently discharged into the intake manifold 67 through a discharge port provided behind the right chamber. The intake manifold 67 is provided on a right side face of the cylinder block 25, and extends longitudinally in parallel to the row of the head covers 40 below the gas manifold 41. Note that a flow amount of compressed air to be refluxed from the intercooler 51 into the compressor 49b is determined in accordance with the degree of opening of the intake bypass valve V2, whereby a flow amount of compressed air to be supplied to the intake manifold 67 is determined.

In addition, the turbine 49a of the supercharger 49 has a rear intake inlet connected to the exhaust relay pipe 48 and a right discharge outlet connected to the exhaust outlet pipe 50. This causes the supercharger 49 to introduce the exhaust gas from the exhaust manifold 44 into the turbine 49a via the exhaust relay pipe 48, thus rotating the turbine 49a, and concurrently rotating the compressor 49b, so that the exhaust gas is discharged from the exhaust outlet pipe 50 to the exhaust path 28 (see FIG. 2). The exhaust relay pipe 48 is connected to the discharge outlet of the exhaust manifold 44, with its rear opened, via a bellows pipe 68, while being connected to an intake inlet behind the turbine 49a, with its front opened.

In addition, at a midway position of the exhaust relay pipe 48, a branch port is provided on the right face side, and one end of an exhaust bypass pipe 69 is connected to the branch port of the exhaust relay pipe 48. The exhaust bypass pipe 69 has another end connected to a join port provided behind the exhaust outlet pipe 50, and part of the exhaust gas discharged from the exhaust manifold 44 is diverted by the exhaust outlet pipe 50 not via the supercharger 49. In addition, the exhaust bypass pipe 69 has an exhaust bypass valve V3 disposed at its midway portion. It sets a flow amount of exhaust gas to be diverting from the exhaust manifold 44 into the exhaust outlet pipe 50 in accordance with the degree of opening of the exhaust bypass valve V3, and adjusts a flow amount of exhaust gas to be supplied to the turbine 49a. Note that the exhaust bypass pipe 69 has a bellows pipe 70 at a position between its portion connected to the exhaust relay pipe 48 and the exhaust bypass valve V3.

An engine-side operating control device 71 that performs control such as starting and stopping the engine device 21 is fixed to the left side face of the intercooler 51 via a support stay (support member) 72. The engine side operating control device 71 has, together with switches that receive starting and stopping the engine device 21 by an operator, a display that displays the state of each portion of the engine device 21. An engine starting device 75 that starts the engine device 21 is fixed to a rear end side on the left side face of the cylinder block 25.

In addition, 73 that controls operation of each portion of the engine device 21 is fixed to a rear end face of the cylinder block 25 via a support stay (support member) 74. At the rear end side of the cylinder block 25, a flywheel 76 that is rotated with it linked to the speed reducer 22 is mounted, and the engine control device 73 is disposed above the flywheel 76. This engine control device 73 collects temperature data, pressure data, etc., of each portion of the engine device 21, with it electrically connected to sensors (pressure sensor and temperature sensor) in the portion of the engine device 21, and, by giving a signal to an electromagnetic valve or the like in the portion of the engine device 21, controls various operations (fuel oil injection, pilot fuel injection, gas injection, cooling water temperature adjustment, etc.) of the engine device 21.

Figure 13:
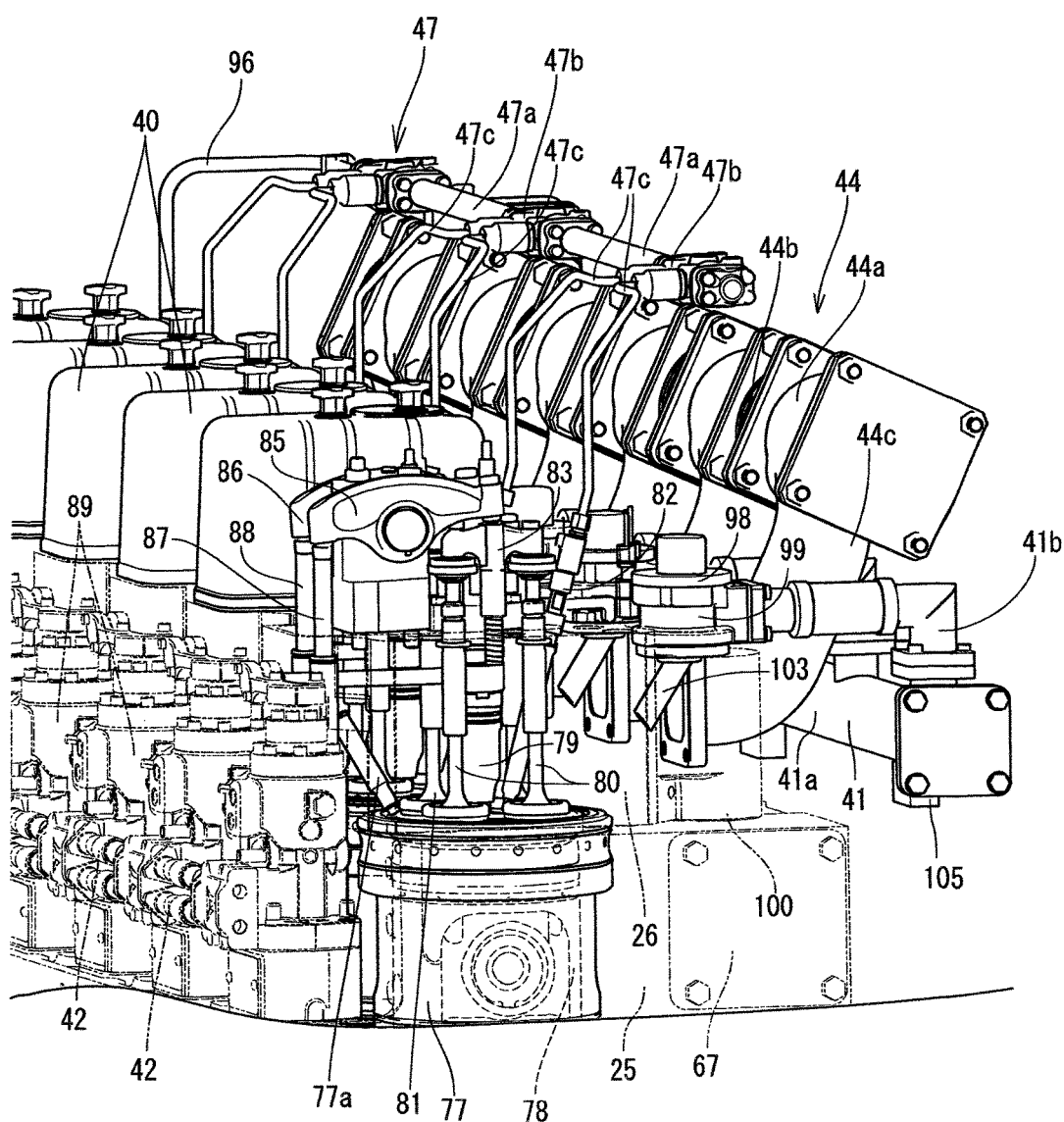
FIG. 13 is an enlarged perspective view of the engine device as viewed from its back side, illustrating an internal configuration of a cylinder head and a cylinder block.

As illustrated in FIG. 13, in the cylinder block 25, a cylinder 77, which is cylindrical, is inserted. In the cylinder 77, a piston 78 reciprocally moves in a vertical direction, whereby the output shaft 24, which is below the cylinder 77, is rotated. A main fuel injection valve 79 that is supplied with fuel oil (liquid combustion) from the fuel oil pipe 42 is inserted into each cylinder head 26 on the cylinder block 25, with its leading end directed to the cylinder 77. This main fuel injection valve 79 has its leading end disposed in the center position on the upper end face of the cylinder 77, and jets the fuel oil in a main combustion chamber formed by the upper face of the piston 78 and an internal wall of the cylinder 77. Therefore, when the engine device 21 is driven in the diffusion combustion method, fuel oil from the main fuel injection valve 79 is jetted into the main combustion chamber in the cylinder 77, whereby in the main combustion chamber, the fuel oil reacts with the compressed air to generate diffusion combustion.

In each cylinder head 26, two intake valves 80 are inserted behind the main fuel injection valve 79, and two exhaust valves 81 are inserted in front of the main fuel injection valve 79.

On the upper end face of the cylinder 77, the intake valves 80 and the exhaust valves 81 are each disposed on a circumference having the leading end of the main fuel injection valve 79 as the center. Opening of the intake valves 80 causes the main combustion chamber in the cylinder 77 to take in the air from the intake manifold 67, while opening of the exhaust valves 81 causes combustion gas (exhaust gas) in the main combustion chamber in the cylinder 77 to be discharged into the exhaust manifold 44. In addition, a cylinder inner pressure sensor 77a is inserted into the cylinder head 26 so that its leading end, which serves as a sensing portion, is directed to the upper end face of the cylinder 77. By always monitoring the internal pressure in the cylinder 77 with this cylinder inner pressure sensor 77a, it is detected whether there is a misfire in the main combustion chamber in the premixing combustion method.

A pilot fuel injection valve 82 that generates an ignition flame in the main combustion chamber is inserted to be inclined with respect to each cylinder head 26 so that its leading end is disposed in the vicinity of the leading end of the main fuel injection valve 79. The pilot fuel injection valve 82 employs a micro-pilot injection method, and has at its leading end a sub-chamber into which pilot fuel is jetted. In other words, by jetting and burning the pilot fuel supplied from the common rail 47 in the sub-chamber, the pilot fuel injection valve 82 generates an ignition flame at the center position of the main combustion chamber in the cylinder 77. Therefore, when the engine device 21 is driven in the premixing combustion method, the pilot fuel injection valve 82 generates the ignition flame, whereby premixed gas supplied to the main combustion chamber in the cylinder 77 via the intake valves 80 is reacted to generate premixing combustion.

Figure 14:
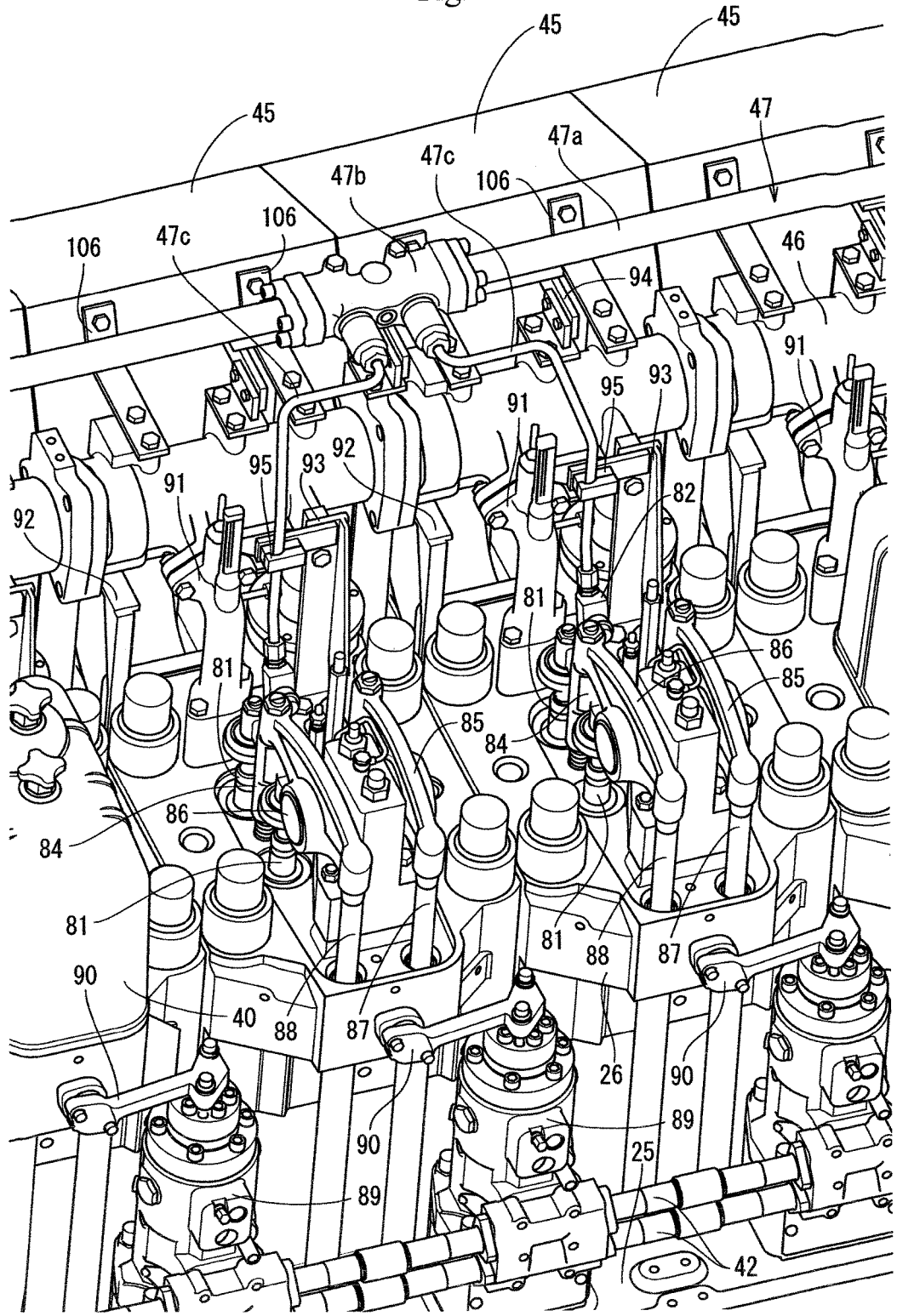
FIG. 14 is an enlarged perspective view of the engine device as viewed from its upper right side, illustrating the configuration of each portion in an upper portion of the cylinder block.

As illustrated in FIGS. 13 and 14, above the cylinder head 26, upper ends of the two intake valves 80 are linked by a bridge 83, and upper ends of the two exhaust valves 81 are linked by a bridge 84. A locker arm 85 in which a right end side of the bridge 83 abuts on its upper face center has a left end linked to a push rod 87 that works with an intake cam in a cam shaft (not illustrated). In addition, a locker arm 86 in which a right end side of the bridge 84 abuts on its upper face center has a left end linked to a push rod 88 that works with an exhaust cam in the cam shaft (not illustrated). Therefore, the respective push rods 87 and 88 are vertically moved in accordance with rotation of the cam shaft, whereby the locker arms 85 and 86 swing to vertically move the intake valve 80 and the exhaust valve 81 respectively via the bridges 83 and 84. The head cover 40 is placed on the cylinder head 26 so as to respectively cover the intake valve 80, the exhaust valve 81, the bridges 83 and 84, the locker arms 85 and 86, and the push rods 87 and 88.

As illustrated in FIGS. 11 to 14, the cylinder block 25 has a stepped portion 25a provided at its left side face upper side, and on an upper face of the stepped portion 25a in the cylinder block 25, fuel injection pumps 89 as many as the head covers 40 and the cylinder heads 26 are disposed. The fuel injection pumps 89 are arranged in a line along the left side face of the cylinder block 25. Their left side faces are linked to the fuel oil pipe (liquefied fuel pipe) 42, and their upper ends are linked to left side faces of the cylinder heads 26 via the fuel discharge pipes 90. Regarding two vertical fuel oil pipes 42, one is a feed pipe that feeds fuel oil to the fuel injection pumps 89, and the other one is an oil return pipe that returns fuel oil from the fuel injection pumps 89. In addition, the fuel discharge pipe 90 supplies fuel oil from the fuel injection pump 89 to the main fuel injection valve 79 by being connected to the main fuel injection valve 79 via the fuel flow path via the cylinder heads 26.

Figure 6:
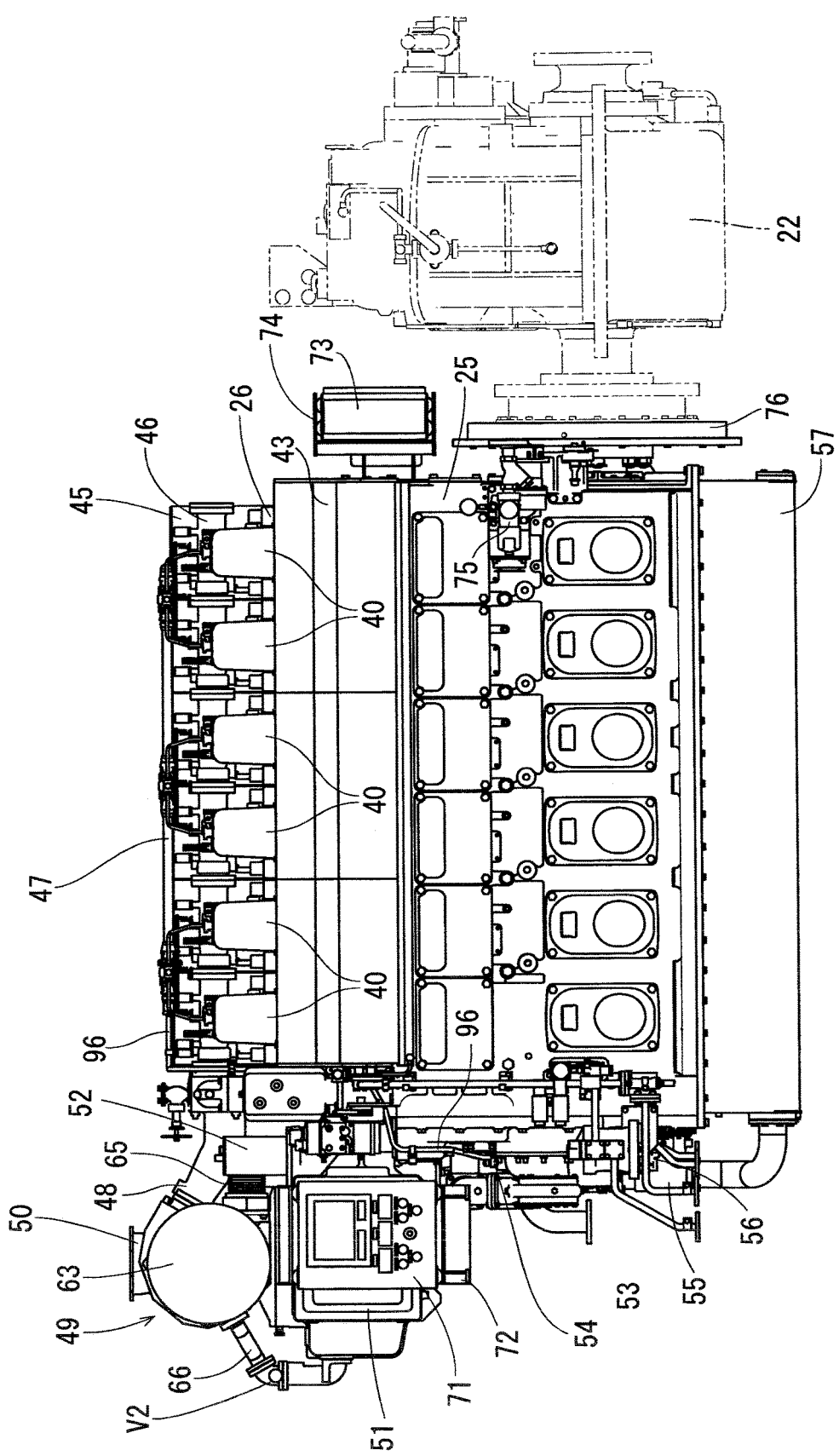
FIG. 6 is a left side face view of the engine device.
Figure 7:
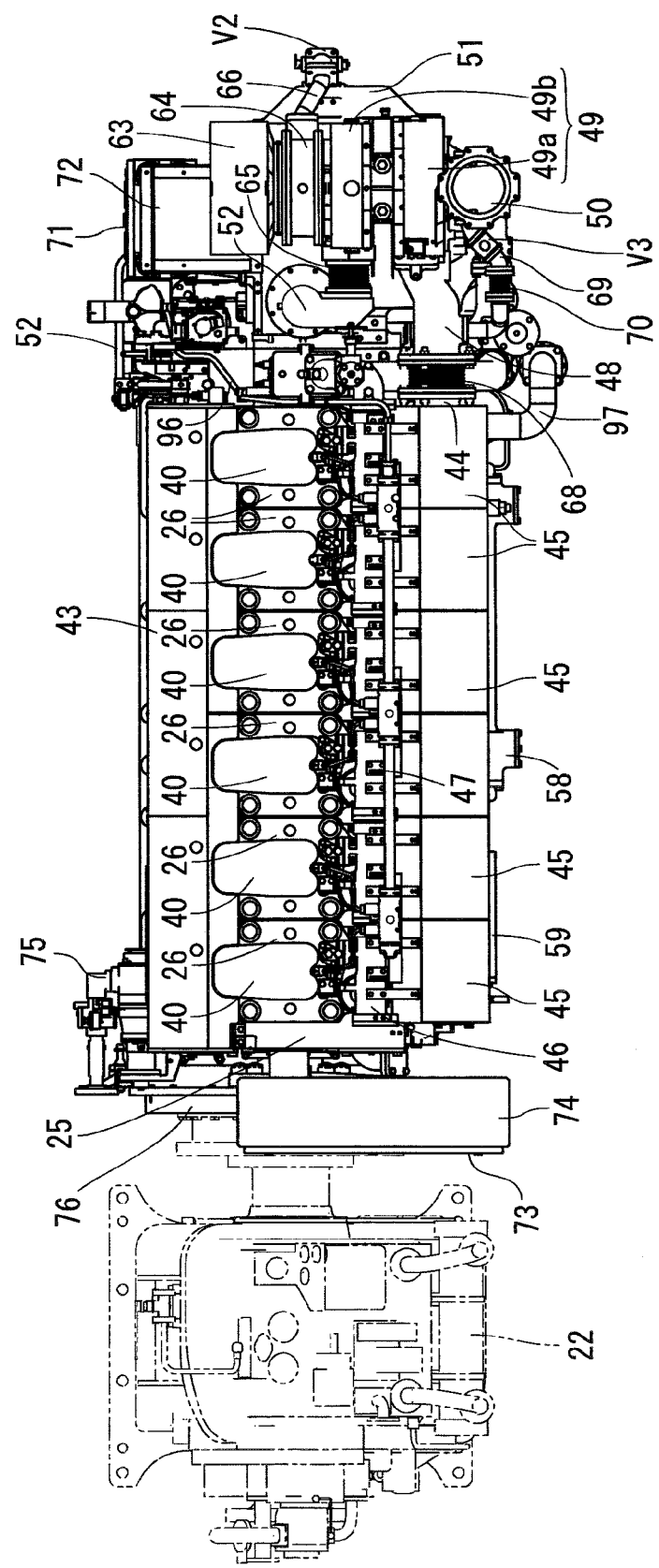
FIG. 7 is a plan view of the engine device.
Figure 8:
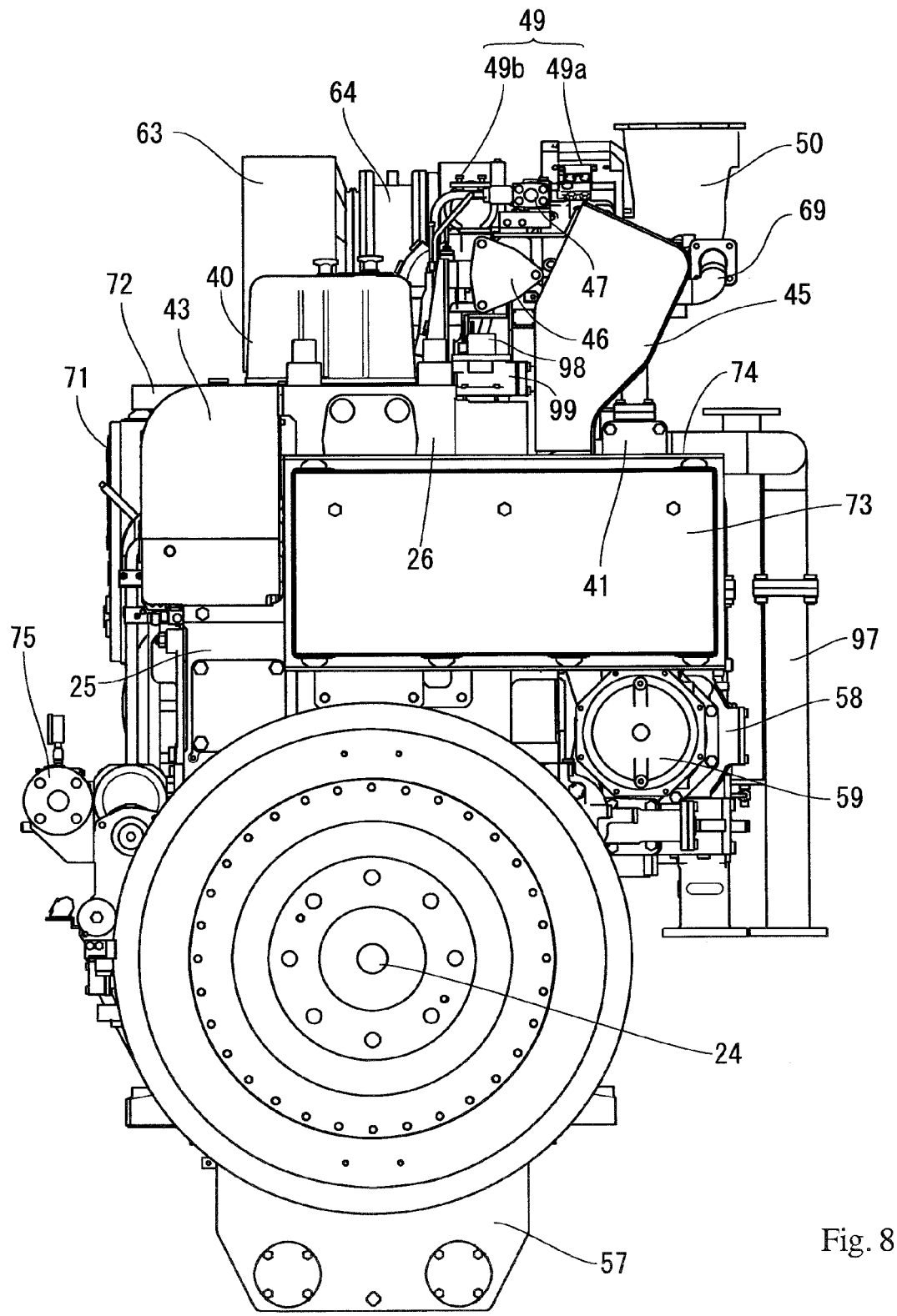
FIG. 8 is a back view of the engine device.
Figure 9:
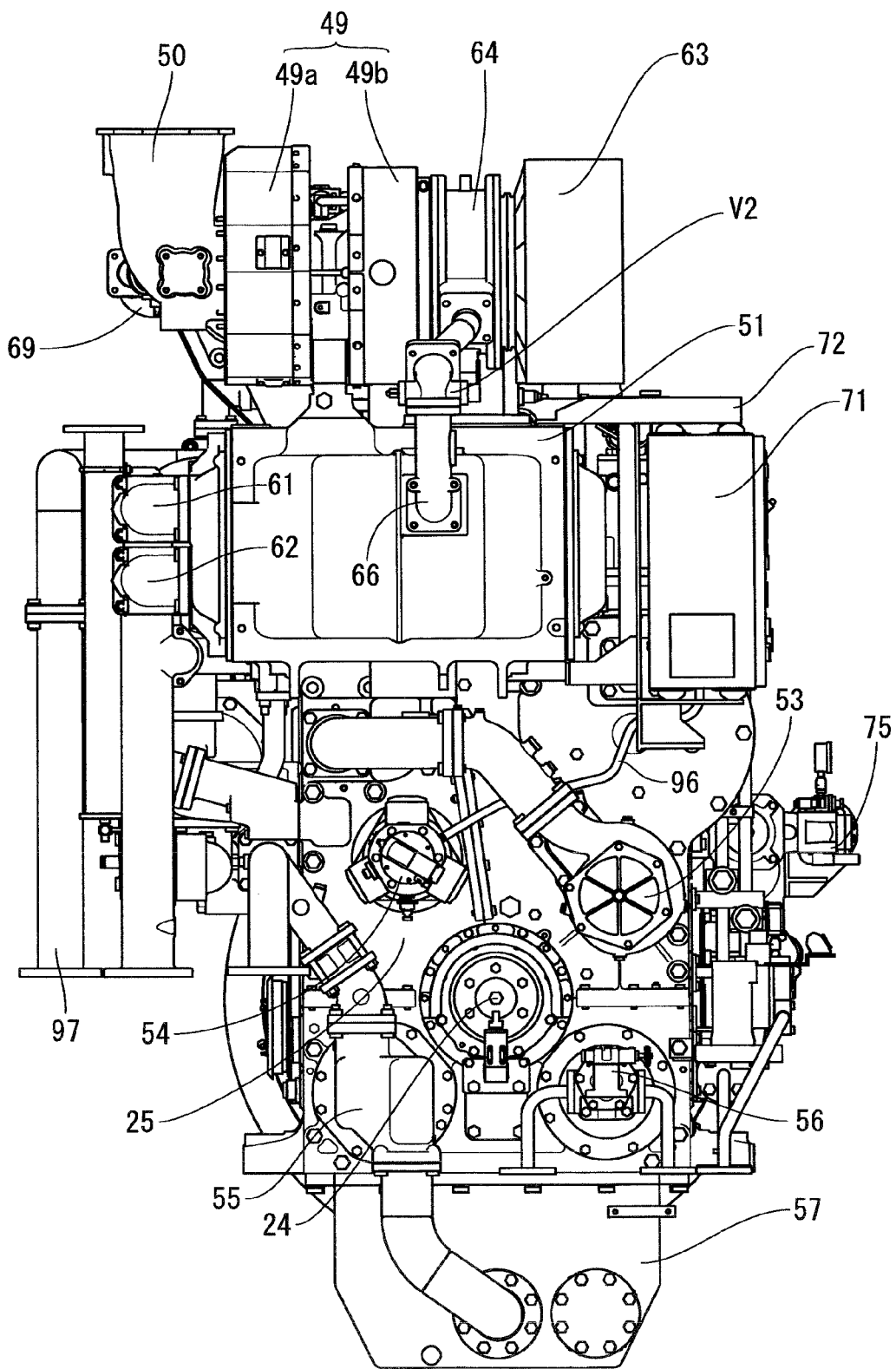
FIG. 9 is a front view of the engine device.

On the stepped portion 25a of the cylinder block 25, the fuel injection pumps 89 are arranged in parallel on the left side with respect to the row of the head covers 40 so as to be behind and at the left side of the cylinder heads 26, which are connected by the fuel discharge pipe 90. In addition, the fuel injection pumps 89 are arranged in a line so as to be interposed between the cylinder heads 26 and the fuel oil pipe 42. As illustrated in FIGS. 6 to 8, the fuel injection pumps 89, together with the fuel oil pipe 42, are covered with the side cover 43, which is placed on the stepped portion 25a of the cylinder block 25. Each fuel injection pump 89 performs a plunger pushing-up operation by rotation of a pump cam in the cam shaft (not illustrated) in the cylinder block 25. Also, the fuel injection pump 89 causes the fuel oil supplied from the fuel oil pipe 42 to increase to high pressure by plunger pushing-up, and supplies the high pressure fuel oil to the fuel injection pump 89 in the cylinder head 26 via the fuel discharge pipe 90.

As illustrated in FIG. 14, the cooling water pipe 46 on the cylinder heads are linked to cooling water branch pipes 91 provided on the upper faces of the plural cylinder heads 26 on the cylinder block 25, and are connected to cooling water paths in the respective cylinder heads 26 via the cooling water branch pipes 91. The cooling water pipe 46 has a lower side face linked to each cylinder head 26 via a support stay (cooling water pipe support member) 92, and a left side face linked to the cylinder head 26 via a support stay (cooling water pipe support member) 93. In other words, the cooling water pipe 46 is linked to the cylinder head 26 via the support stays 92 and 93, and the cooling water branch pipe 91, and is supported at a position on the right side of the head cover 40 and above the cylinder head 26. In addition, the cooling water branch pipe 91 is fastened at a position between the support stays 92 and 93, which are fastened before and after the cylinder head 26, so that the cooling water path in the cylinder head 26 and the cooling water path in the cooling water pipe 46 are linked to each other.

As illustrated in FIGS. 10 to 15, the common rail (pilot fuel pipe) 47 is supported on the upper face of the cooling water pipe 46 via support brackets (pilot fuel pipe support members) 94. The common rail 47 has a pilot fuel main pipe 47a that extends in parallel to the cooling water pipe 46, branch portions 47b that distribute the pilot fuel, which flows through the pilot fuel main pipe 47a, in units of the cylinder heads 26, and pilot fuel branch pipes 47c connected from the branch portions 47b to the pilot fuel injection valves 82.

Each branch portion 47b is disposed at a boundary position between two adjacent cylinder heads 26, and are connected to two pilot fuel branch pipes 47c connected to the pilot fuel injection valves 82 in the respective adjacent cylinder heads 26. In addition, the branch portions 47b are fastened to the support brackets 94 so as to be placed on the support brackets 94. The support brackets 94 have lower sides fastened to pedestals provided on the cooling water pipe 46 at plural positions (three positions in the example of FIG. 15). The branch portions 47b are fixed by the support brackets 94, whereby the common rail 47 is supported on the cooling water pipe 46 so as to extend for the cooling water pipe 46 via the support brackets 94. Since in the cylinder heads 26, the common rail 47 is supported by the cooling water pipe 46, which has a relatively low temperature, the common rail 47 can be prevented from having a high temperature.

The pilot fuel branch pipes 47c have portions on the side of the branch portions 47b that extend in parallel to (in the longitudinal direction) the pilot fuel main pipe 47a in planar view (top view), and portions on the side of the pilot fuel injection valves 82 that vertically (in the up-down direction) extend to the pilot fuel main pipe 47a. Also, the pilot fuel branch pipes 47c are fixed by the branch pipe fixing members 95 provided on the support stays (cooling water pipe support members) 93. In other words, regarding the pilot fuel branch pipes 47c, each pipe portion that vertically extends on the side of the pilot fuel injection valves 82 is provided between the branch pipe fixing members 95. This fixes the pilot fuel branch pipes 47c in the cylinder heads 26 via the branch pipe fixing members 95 and the support stays 93.

As illustrated in FIGS. 6, and 9 to 12, a front end of the common rail 47 is connected to a discharge side of the pilot fuel pump 54 via the pilot fuel relay pipe 96, so that pilot fuel discharged from the pilot fuel pump 54 is supplied to the common rail 47. In order that on a front face of the cylinder block 25, the discharge outlet of the pilot fuel pump 54 and the front end of the common rail 47 may be connected to each other, the pilot fuel relay pipe 96 has a shape in which after it is extended from the discharge outlet of the pilot fuel pump 54 to above the left side face of the cylinder block 25, it is bent and the front end face of the cylinder head 26 is elongated from the left side face of the cylinder head 26 toward the front end of the common rail 47.

As illustrated in FIGS. 5, 10, 12, and 13, the gas manifold 41 is connected to the gas inlet pipe 97, which is part of a gas pipe path connected to the gas valve unit 35 (see FIG. 4), in the front of the right side face of the cylinder block 25 so that fuel gas is supplied by pressure. In other words, the front end of the gas manifold 41 is linked to the gas inlet pipe 97, so that fuel gas from the gas valve unit 35 is supplied to the gas manifold 41. The gas manifold 41 extends along the row of the head covers 40 at a height position between the exhaust manifold 44 and the intake manifold 67.

The gas manifold 41 includes a gas main pipe 41a whose front end is connected to the gas inlet pipe 97 and that longitudinally extends, and plural gas branch pipes 41b that are branched from an upper face of the gas main pipe 41a toward the cylinder heads 26. The gas main pipe 41a is provided with connecting flanges on its upper face at equal intervals, and is fastened to inlet side flanges of the gas branch pipes 41b. An end portion of each gas branch pipe 41b that is opposite its portion linked to the gas main pipe 41a is linked to a right side face of a sleeve 99 into which the gas injector 98 is inserted from above.

The gas main pipe 41a and the gas branch pipes 41a that form the gas manifold 41. are each formed of a double pipe, and the gas inlet pipe 97 and the sleeve 99 are also formed of a double pipe. In other words, gas pipes on the downstream side of the gas valve unit 35 are formed to have a double pipe structure in which a high pressure inner pipe is covered with an outer pipe. The inner pipe (inner space) allows fuel gas to flow through it toward the gas injector 98 via the gas manifold 41. Meanwhile, in gas pipes on the downstream side of the gas valve unit 35, a space (outer space) between an outer pipe and an inner pipe causes the gas valve unit 35 to collect fuel gas that has not been supplied to the main fuel chamber of the cylinder 77.

As illustrated in FIGS. 10, 12, 13, and 15, the exhaust manifold 44 has exhaust main pipes 44a and bellows pipes 44b that are alternately linked to one another in a link, and exhaust branch pipes 44c branched from below the exhaust main pipes 44a are linked to right side faces of the cylinder heads 26. The exhaust main pipes 44a and the exhaust branch pipes 44c are individually provided as many as the cylinder heads 26, and the exhaust branch pipes 44c are linked to right side face front sides of the cylinder heads 26. In other words, in the front side portion of each cylinder head 26 on which the exhaust valve 81 is disposed, an exhaust inlet side of each exhaust branch pipe 44c is connected to an exhaust outlet on the right side face of the cylinder head 26. In addition, the exhaust manifold 44 is supported by the cylinder heads 26 in such a manner that the exhaust inlet sides of the exhaust branch pipes 44c are fastened to right side faces of the cylinder heads 26.

As illustrated in FIGS. 5, 10, 13, 15, and 16, the intake manifold 67 is provided at an upper right side of the cylinder block 25 so as to longitudinally extend at a position at which the height position of the intake manifold 67 is lower than the gas manifold 41. In addition, as illustrated in FIGS. 10, 13, and 15 to 17, right side faces of the cylinder heads 26 have rear portions that protrude toward the gas manifold 41. The cylinder heads 26 are formed to intake branch portions 100 that have therein air channels 101 causing the protruding portions on the right side faces to communicate with one another directly above the intake manifold 67. In other words, a rear side portion of each cylinder head 26 in which the intake valve 80 is disposed is connected to the intake manifold 67 via each intake branch portion 100.

Figure 17:
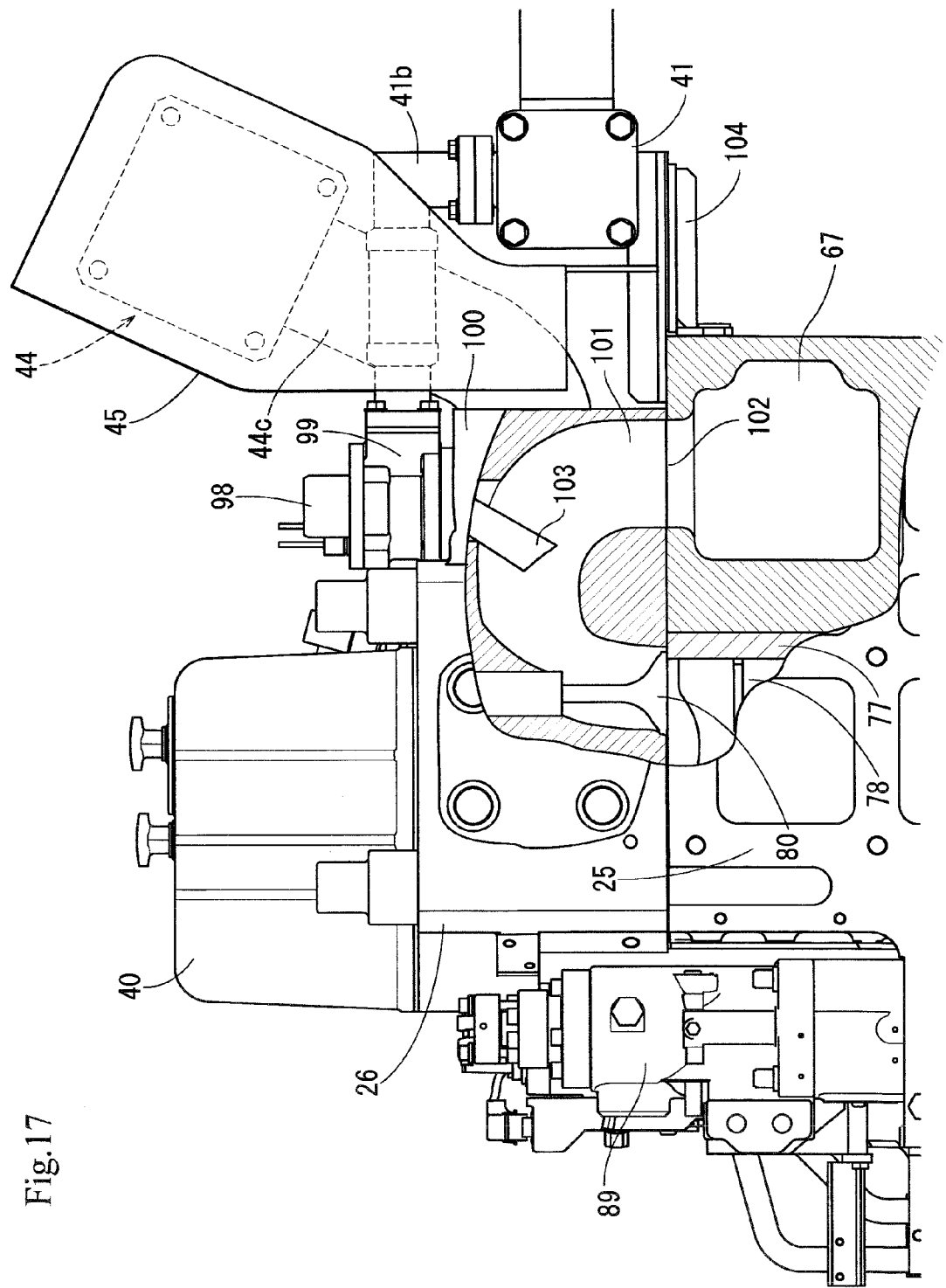
FIG. 17 is a partial sectional view of the engine device as viewed from its back, illustrating an internal configuration of the cylinder head and the cylinder block.

As illustrated in FIG. 17, for each cylinder head 26, the intake manifold 67 has an intake inlet 102 whose upper side is open. At a position in which the intake inlet 102 and the air channel 101 are caused to communicate with each other, the intake branch portion 100 for the cylinder head 26 is disposed. Therefore, the cylinder head 26 is linked to the exhaust branch pipe 44c of the exhaust manifold 44 in front of the right side face, while it has the intake branch portion 100, which is connected to the intake manifold 67, behind the right side face.

In other words, directly above the intake manifold 67, the exhaust branch pipes 44c of the exhaust manifold 44 and the intake branch portions 100 of the cylinder head 26 are alternately arranged in a line.

As illustrated in FIGS. 13 and 17, upper faces of the intake branch portions 100 of the cylinder head 26 are configured as pedestals to which sleeves 99 are fixed. A gas injection nozzle 103 provided on a bottom face of the each sleeve 99 is inserted into an air channel 101 inside each intake branch portion 100. The air channel 101 of the cylinder head 26 is formed to have an inverse U-shape that causes the intake inlet 102 of the intake manifold 67 and the main combustion chamber of the cylinder 77 to communicate with each other. Above the intake inlet 102, the gas injection nozzle 103 is inserted into the air channel 101. The gas injection nozzle 103 is inclined to the inner side (left side) of the cylinder head 26 so that the fuel gas is jetted along a stream of air.

When the engine device 21 operates in the diffusion combustion method, the gas injector 98 causes the gas injection nozzle 103 to be in always stopping jetting of the fuel gas. Accordingly, on air that flows through the intake manifold 67 flows toward the intake valve 80 through the air channel 101.

Also, by opening the intake valve 80, air is taken in into the main combustion chamber in the cylinder 77. Also, by closing the intake valve 80 and sliding the piston 78 to compress the air in the main combustion chamber, and subsequently jetting the fuel oil with the main fuel injection valve 79, the fuel oil is burnt in the main combustion chamber. After that, by opening the exhaust valve 81, combustion gas (exhaust gas) in the main combustion chamber is discharged into the exhaust manifold 44 through the exhaust flow path in the cylinder head 26.

Meanwhile, when the engine device 21 operates in the premixing combustion method, the gas injector 98 causes the gas injection nozzle 103 to jet the fuel gas into the air channel 101. Thus, in the air channel 101, the fuel gas jetted from the gas injection nozzle 103 is mixed into the air flowed in from the intake manifold 67. Also, the mixture gas in which the fuel gas has been mixed flows toward the intake valve 80 through the air channel 101. At this time, by opening the intake valve 80, the main combustion chamber in the cylinder 77 is caused to take in the mixture gas. Also, by closing the intake valve 80 and sliding the piston 78 to compress the mixture gas in the main combustion chamber, and subsequently jetting an ignition flame into with the pilot fuel injection valve 82, the mixture gas is burnt in the main combustion chamber. After that, by opening the exhaust valve 81, combustion gas (exhaust gas) in the main combustion chamber is discharged into the exhaust manifold 44 through the exhaust flow path in the cylinder head 26.

Figure 10:
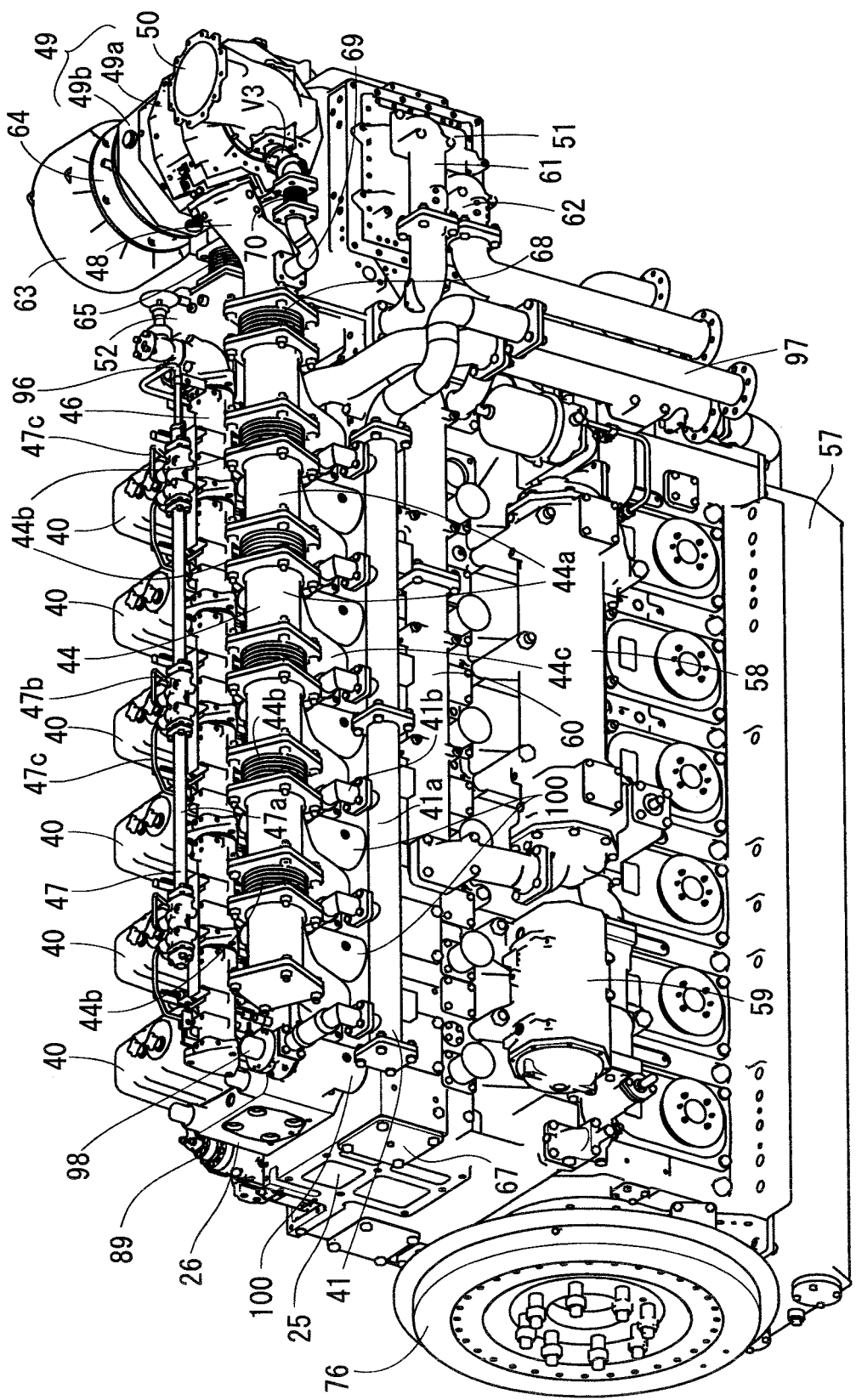
FIG. 10 is a perspective view illustrating an exhaust manifold mounted side (right side face) of the engine device.
Figure 11:
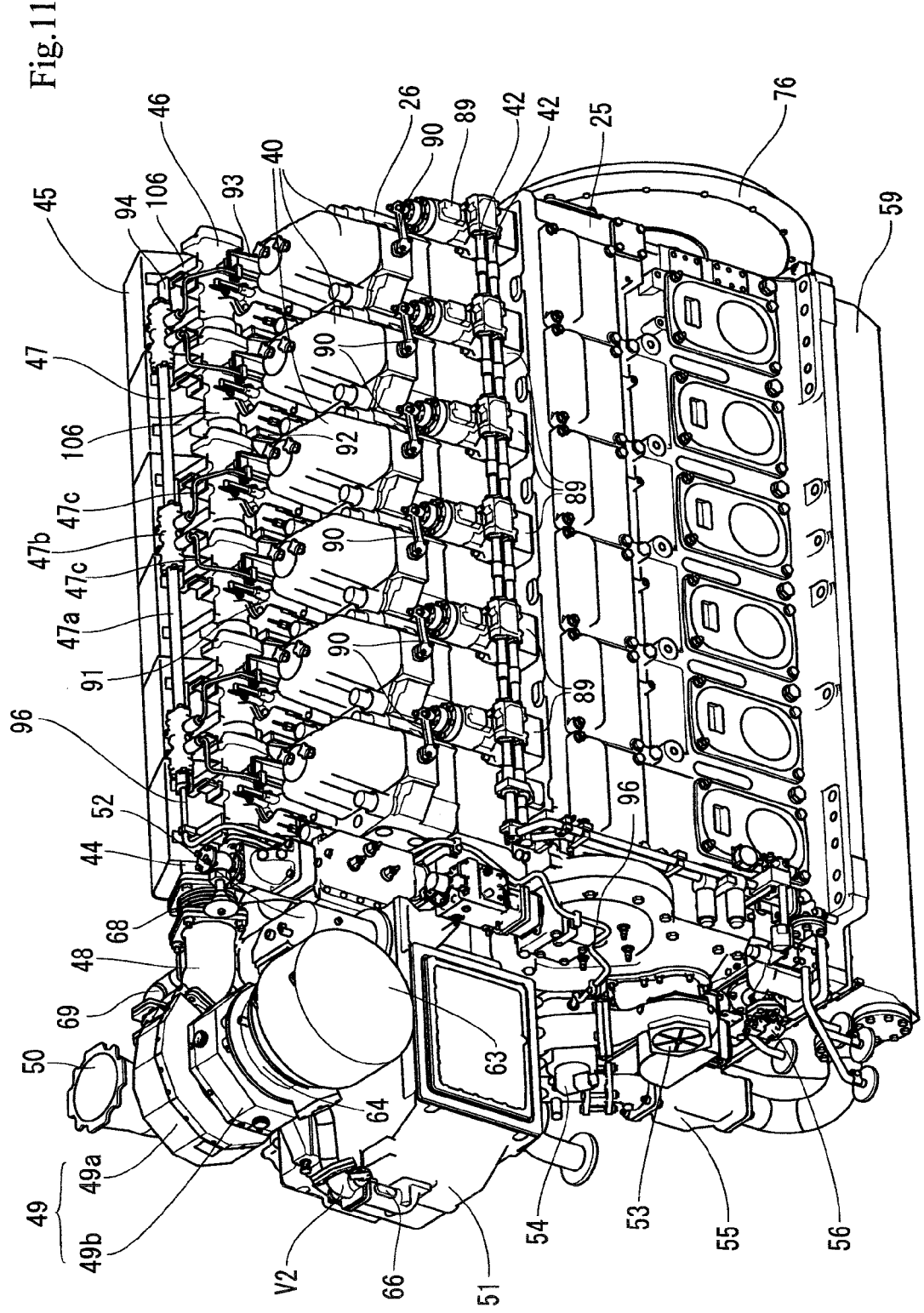
FIG. 11 is a perspective view illustrating a fuel injection pump mounted side (left side face) of the engine device.
Figure 12:
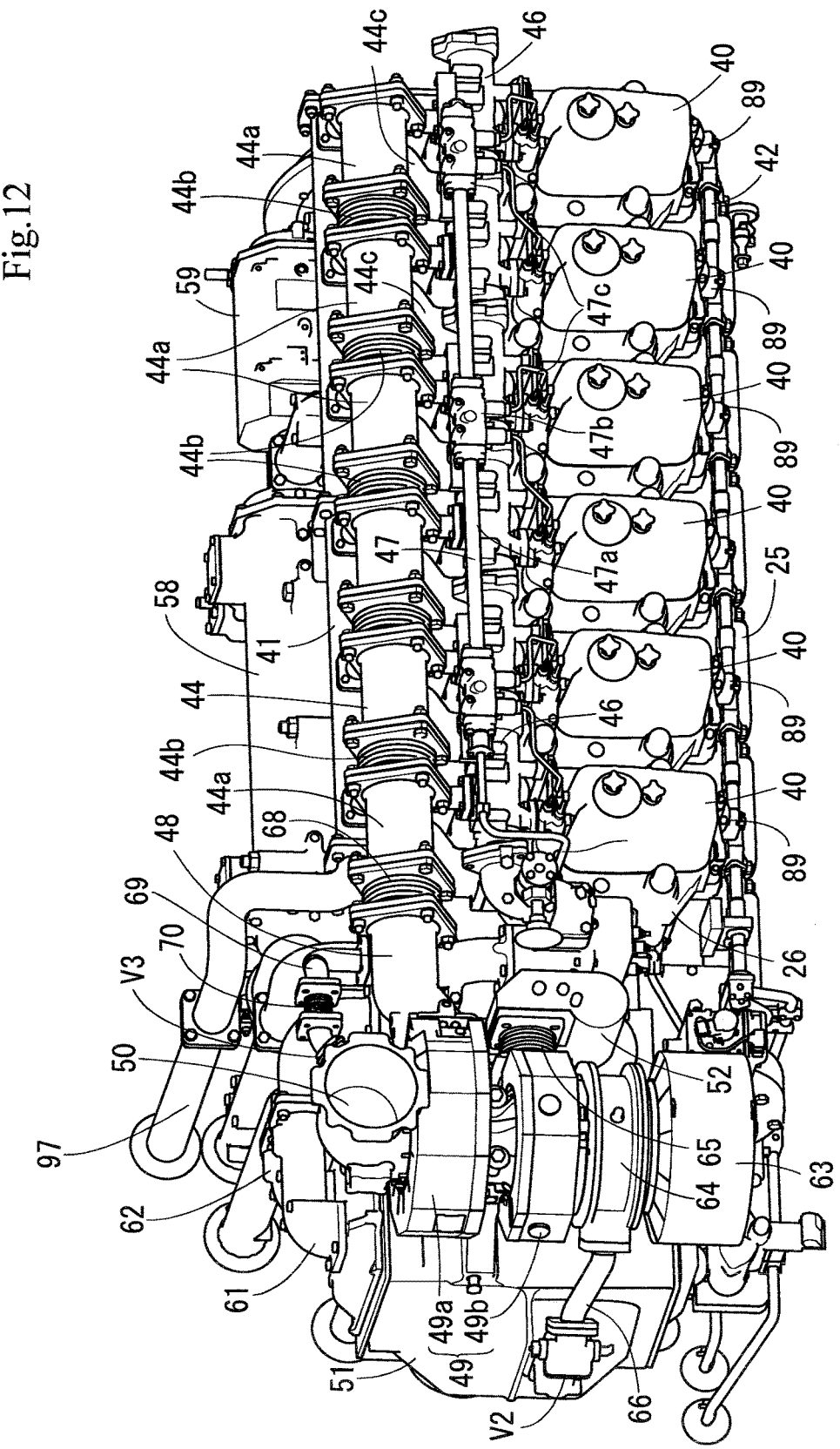
FIG. 12 is a perspective view as viewed from above (front upper side) the supercharger of the engine device.
Figure 15:
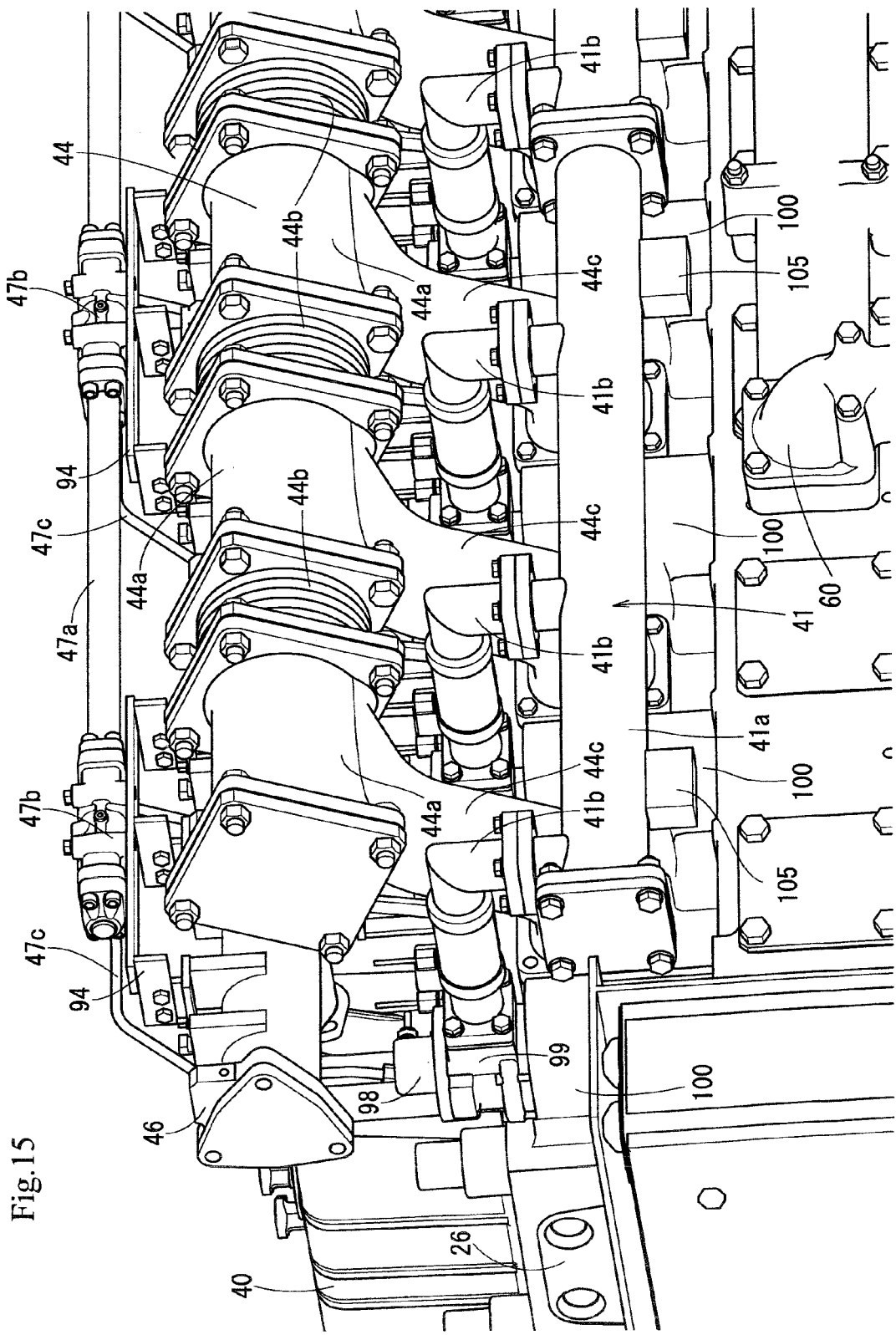
FIG. 15 is an enlarged perspective view, as viewed from its back right side, of the engine device in a state in which a thermal insulation cover is removed.
Figure 16:
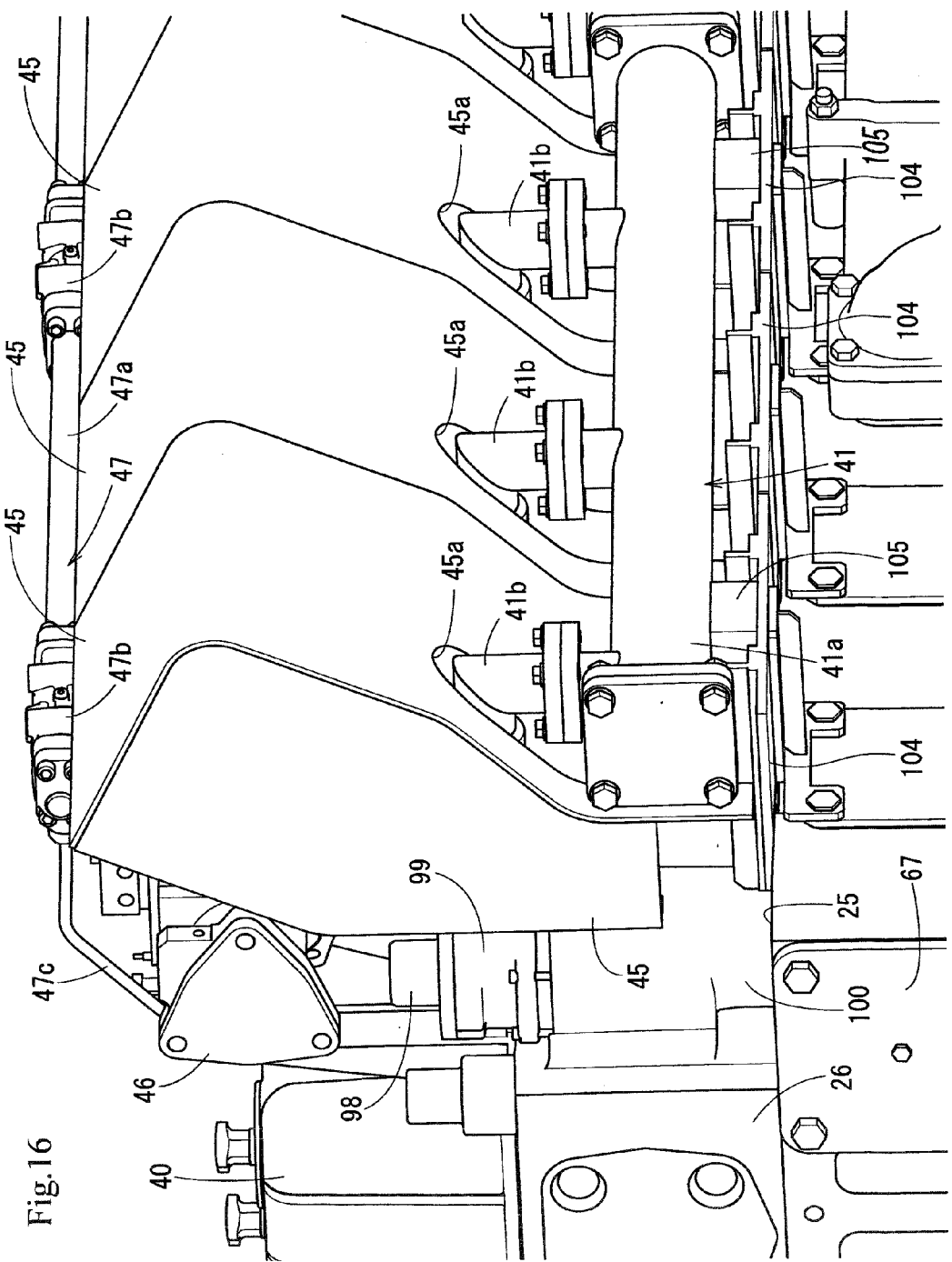
FIG. 16 is an enlarged perspective view of the engine device as viewed from its back right side.

In addition, as illustrated in FIGS. 10, 13, and 15, in the gas manifold 41, the gas branch pipes 41*b*, which are provided at equal intervals with respect to the gas main pipes 41*a*, extend toward the intake branch portions 100 of the cylinder heads 26 so as to pass under the exhaust manifold 44. In other words, the gas branch pipes 41*b* are disposed at the same position as the gas injector 98 on the intake branch portions 100 so as to be along the axial direction (longitudinal direction) of the gas main pipe 41*a*, and link the gas main pipe 41*a* and the sleeve 99, passing between the exhaust branch pipes 44*c* of the exhaust manifold 44. Also, directly below the exhaust manifold 44, the gas branch pipes 41*b* of the gas manifold 41 and the exhaust branch pipes 44*e* of the exhaust manifold 44 are alternately arranged in a line.

As illustrated in FIGS. 13, and 15 to 17, in the gas manifold 41, the lower face of the gas main pipe 41*a* abuts on support spaces (gas manifold support members) 105 on support brackets 104 fixed to the cylinder block 25. Each support bracket 104 has a plate-shape that is in parallel to the upper face of the cylinder block 25, and that extends from the upper face of the cylinder block 25 toward outside, and is fixed to the right side face and upper face of the cylinder block 25. The gas manifold 41 is supported on the plate-shaped support bracket 104, which is fixed to an uppermost portion of the right side face of the cylinder block 25 on the side of the intake manifold 67, via each support spacer 105. Therefore, the gas manifold 41 is supported from below by the cylinder block 25 via the support bracket 104 and the support spacer 105, and is also supported from above to hang by the cylinder head 26 such that the gas branch pipes 41*b* links to the sleeve 99.

As illustrated in FIGS. 14 to 17, the thermal insulating cover 45 is configured to cover the outer circumferential face and rear end of the exhaust manifold 44. The thermal insulating cover 45 covers the entire right side face and entire upper face of the exhaust manifold 44, while for the left side face of the exhaust manifold 44, the thermal insulating cover 45 covers part of its upper side in order to link each of the gas branch pipe 41*b* and each exhaust branch pipe 44*c* to the cylinder head 26. Also, part of the right side face of the thermal insulating cover 45 is provided with a cutout portion 45*a*, and the gas branch pipe 41*b* is inserted into the cutout portion 45*a*. Since an air layer formed between the thermal insulating cover 45 and the exhaust manifold 44 functions as a thermal insulation layer, influence on surroundings by the exhaust heat from the exhaust manifold 44 is reduced.

The thermal insulating cover 45 has a left side face linked to the upper face of the cooling water pipe 46 via the support bracket (cover support member) 106, and is supported to hang by the cooling water pipe 46. The support bracket 106 has a right end side fastened to a pedestal provided on the upper face of the cooling water pipe 46, and a left side fastened to the upper side of the left side face of the thermal insulating cover 45. In addition, the support bracket 106 is disposed as to cross the common rail 47 below it. In this manner, the thermal insulating cover 45 is connected to the cooling water pipe 46, whereby heat transfer from the cooling water pipe 46 can inhibit an increase in temperature caused by radiant heat from the exhaust manifold 44. Thus, a thermal insulation effect can be enhanced by the thermal insulating cover 45. In addition, the thermal insulating cover 45 has a right side face that abuts on the upper face of the support bracket 104, and is also supported by the cylinder block 25. In other words, as described above, the support bracket 104 functions as a support member of the gas manifold 41 and functions as a support member of the thermal insulating cover 45.

The engine device 21 includes the intake valve 80 that causes the main combustion chamber in the cylinder 77 to take in air, the exhaust valve 81 that causes the main combustion chamber to discharge combustion gas, the main fuel injection valve 79 that jets and burn liquid fuel in the main combustion chamber, and the gas injector 98 that mixes gas fuel with the air taken in by the main combustion chamber. Also, in the engine device 21, the gas fuel pipe 41 that supplies gas fuel to the gas injector 98, and the fuel oil pipe 42 that supplies liquid fuel to the main fuel injection valve 79 are disposed so as be divided on both sides of the row of the head covers 40 arranged at a line. In addition, in the engine device 21, the intake manifold 67 that supplies air to be taken in by the main combustion chamber toward the intake valve 80 extends in parallel to the row of the head covers 40 in the cylinder block 25, and the gas manifold 41 and the intake manifold 67 are disposed on the same side of the row of the head covers 40.

In the engine device 21, the gas manifold 41 and the fuel oil pipe 42 are disposed so as to be divided with respect to the head covers 40, whereby both can be disposed around the cylinder head 26, with space saved, thus forming a compact piping structure. In addition, since the gas manifold 41 and the intake manifold 67 are arranged on the same side of the row of the head covers 40, a piping distance between the gas injector 98 and the gas manifold 41, which are disposed on the intake side, can be shortened, thus reducing pressure loss in the liquid fuel pipe 41.

In the engine device 21, the exhaust manifold 44 that causes the main combustion chamber to discharge combustion gas extends in parallel to the row of the head covers 40. On the same side of the row of the head covers 40, the exhaust manifold 44 and the intake manifold 67 are disposed so as to be divided above and below the liquid fuel pipe 41. In this manner, in the engine device 21, the gas manifold 41 and the exhaust manifold 44 are collectively provided on the same side of the cylinder head 26. Thus, on the other side of the cylinder head 26, the fuel injection pump 89 that supplies high pressure liquid fuel to the main fuel injection valve 79, and the fuel oil pipe 42 are collectively disposed.

In the engine device 21, the pilot fuel pump 54 that, jets an ignition flame in the main combustion chamber is included and the common rail 47 that supplies pilot fuel to the pilot fuel pump 54 extends in parallel to the row of the head covers 40. Also, above the cylinder block 25, at a position between the row of the head covers 40 and the exhaust manifold 44, the cooling water pipe 46 extends in parallel to the row of the head covers 40, and above the cooling water pipe 46, the pilot fuel pump 54 is supported. Since the common rail 47 is supported on the cooling water pipe 46, the common rail 47 can prevent a temperature increase caused by high temperature exhaust gas temperature. Therefore, the common rail 47 can be disposed on the side of the exhaust manifold 44, and individual pipes can compactly, collectively be disposed.

In the engine device 21, the as manifold 41 is formed in a double pipe structure formed of the inner pipe that supplies gas fuel toward the gas injector 98 and the outer pipe that into which gas fuel flows from the gas injector 98. By forming the gas manifold 41 in the double pipe structure in this manner, gas fuel left in the gas injector 98 can be returned to a fuel source side such as the gas valve unit 35, so that the pressure of the gas manifold 41 can be maintained to be constant.

In the engine device 21, at one end in its upper portion, the supercharger 49 that compresses air with exhaust gas from the exhaust manifold 44 is disposed, and the intercooler 51 that cools supplies, to the intake manifold 67, compressed air as the air compressed by the supercharger 49 is disposed below the supercharger 49. Since in the engine device 21, at its one end, the supercharger 49 and the intercooler 51 are disposed in a stacked manner, the device configuration can be compactly formed. In addition, by vertically disposing the supercharger 49 and the intercooler 51 correspondingly to the arrangement of the exhaust manifold 44 and the intake manifold 67, shortest piping between the exhaust manifold 44 and the intake manifold 67 can be formed without difficulty.

In the engine device 21, on one side face at the side of the fuel gas pipe 41 of the cylinder block 25, the lubricant oil cooler 58 and the lubricant oil strainer 59 are arranged in series. Also, at a position between the gas manifold 41 and the lubricant oil cooler 58, the lubricant-oil-cooling cooling water pipe (first cooling water pipe) 60 through which cooling water to be supplied to the lubricant oil cooler 58 flows is disposed to extend along the lubricant oil cooler 58, with it separated from the above one side face. The cylinder-head-cooling cooling water pipe (second cooling water pipe) 46 connected to the cylinder head 26 extends above the cylinder block 25 in parallel to the row of the head covers 40 at a position between the head cover 40 and the gas fuel pipe 41.

In the engine device 21, the lubricant oil cooler 58 and the lubricant oil strainer 59 are disposed at a side face of the engine device 21, which is the side of the gas manifold 41, and the lubricant-oil-cooling cooling water pipe (first cooling water pipe) 60 that supplies cooling water to the lubricant oil cooler 58 is disposed on the same side face of the engine device 21. This makes it possible to compactly collectively dispose the lubricant oil circulation system in the engine device 21, and to simplify its maintenance operations. Further, also the cylinder-head-cooling cooling water pipe (second cooling water pipe) 46 is disposed above the engine device 21 on the same side as the lubricant-oil-cooling cooling water pipe (first cooling water pipe) 60. Thus, the cooling water pipes to be disposed outside the engine device 21 can collectively disposed, and their lengths can be shortened.

In the engine device 21, on one end face of the cylinder block 25, which is perpendicular to the engine output shaft 24, at one side face side, as an outer circumferential side of the output shaft 24, of the cylinder block 25 in which the lubricant oil cooler 58 is disposed, the lubricant oil pump 55 is disposed and supplies with the lubricant oil cooler 58 with lubricant oil sucked up by the lubricant oil pump 55. Since the lubricant oil pump 55 is disposed near the lubricant oil cooler 58, the lubricant oil pump 55 and the lubricant oil cooler 58 can be connected by a short piping.

Other configurations of individual portions are not limited to the illustrated embodiment, and can variously be modified without departing the gist of the invention of the present invention. In addition, the engine device of the embodiment is applicable to configurations other than the above-described propelling and power generating mechanism, such as configuring the invention as a power generator for supplying power to electrical systems in a vessel body and as a driving source in a land power generating facility.

DESCRIPTION OF THE REFERENCE NUMERAL 1 vessel
2 vessel body
4 funnel
5 propeller
9 propelling shaft
11 engine room
12 propelling and power generating mechanism
21 engine device (dual fuel engine)
22 speed reducer
23 shaft-driven generator
24 output shaft (crank shaft)
25 cylinder block
26 cylinder head
40 head cover
41 gas manifold (gas fuel pipe)
42 fuel oil pipe (liquid fuel pipe)
43 side cover
44 exhaust manifold
45 thermal insulating cover
46 cooling water pipe
47 common rail (pilot fuel pipe)

48 exhaust relay pipe
49 supercharger
51 intercooler
53 cooling water pump
54 pilot fuel pump
55 lubricant oil pump
56 fuel oil pump
57 oil pan
58 lubricant oil cooler
59 lubricant oil strainer
67 intake manifold
77 cylinder
78 piston
79 main fuel injection
80 intake valve
81 exhaust valve
82 pilot fuel injection valve
89 fuel injection pump
90 fuel discharge pipe
91 cooling water branch pipe
992 support stay
93 support stay
94 support bracket
95 branch pipe fixing member
96 pilot fuel relay pipe
97 gas inlet pipe
98 gasp injector
99 sleeve
100 intake branch portion
101 air channel
202 intake inlet
103 gas injection nozzle

The invention claimed is:

1. An engine device comprising: an intake valve that causes a main combustion chamber in a cylinder of an engine to take in air; an exhaust valve that causes the main combustion chamber to discharge combustion gas; a main fuel injection valve that jets and burns liquid fuel in the main combustion chamber; a pilot fuel injection valve that jets an ignition flame in the main combustion chamber, wherein a pilot fuel pipe that supplies pilot fuel to the pilot fuel injection valve extends in parallel to the row of head covers; and a gas injector that mixes gas fuel with the air taken in by the main combustion chamber,
wherein a gas fuel pipe that supplies the gas fuel to the gas injector and a liquid fuel pipe that supplies the liquid fuel to the main fuel injection valve are disposed to be divided on both sides of a row of head covers arranged in a line, and
wherein an intake manifold that supplies the air taken in by the main combustion chamber toward the intake valve extends in parallel to the row of head covers in a cylinder block, and the gas fuel pipe and the intake manifold are arranged on the same side of the row of head covers; and
wherein above the cylinder block, at a position between the row of head covers and an exhaust manifold, a cooling water pipe extends in parallel to the row of head covers, and above the cooling water pipe, the pilot fuel pipe is supported.

2. The engine device according to claim 1, wherein the exhaust manifold conducts the combustion gas from the main combustion chamber and extends in parallel to the row of head covers and on the same side of the row of head covers as the gas fuel pipe and the intake manifold, and the exhaust manifold and the intake manifold are disposed to be divided above and below the gas fuel pipe.

3. An engine device comprising: an intake valve that causes a main combustion chamber in a cylinder of an engine to take in air; an exhaust valve that causes the main combustion chamber to discharge combustion gas; a main fuel injection valve that jets and burns liquid fuel in the main combustion chamber; and a gas injector that mixes gas fuel with the air taken in by the main combustion chamber,
wherein a gas fuel pipe that supplies the gas fuel to the gas injector and a liquid fuel pipe that supplies the liquid fuel to the main fuel injection valve are disposed to be divided on both sides of a row of head covers arranged in a line, and
wherein an intake manifold that supplies the air taken in by the main combustion chamber toward the intake valve extends in parallel to the row of head covers in a cylinder block, and the gas fuel pipe and the intake manifold are arranged on the same side of the row of head covers; and
wherein on one side face, as the side of the gas fuel pipe, of the cylinder block, a lubricant oil cooler and a lubricant oil strainer are arranged in series,
wherein at a position between the gas fuel pipe and the lubricant oil cooler, a first cooling water pipe that supplies cooling water to the lubricant oil cooler extends along the lubricant oil cooler, with the first cooling water pipe separated from one side face of the cylinder block, and
wherein a second cooling water pipe connected to a cylinder head on the cylinder block extends in parallel to the row of head covers above the cylinder block at a position between the head covers and the fuel gas pipe.

4. An engine device comprising: an intake valve that causes a main combustion chamber in a cylinder of an engine o take in air; an exhaust valve that causes the main combustion chamber to discharge combustion gas; a main fuel injection valve that jets and burns liquid fuel in the main combustion chamber; and a gas injector that mixes gas fuel with the air taken in by the main combustion chamber,
wherein a gas fuel pipe that supplies the gas fuel to the gas injector and a liquid fuel pipe that supplies the liquid fuel to the main fuel injection valve are disposed to be divided on both sides of a row of head covers arranged in a line, and
wherein an intake manifold that supplies the air taken in by the main combustion chamber toward the intake valve extends in parallel to the row of head covers in a cylinder block, and the gas fuel pipe and the intake manifold are arranged on the same side of the row of head covers; and
wherein the gas fuel pipe has a double pipe structure formed of an inner pipe that supplies the gas fuel toward the gas injector and an outer pipe into which the gas fuel flows from the gas injector.

5. The engine device according to claim 4, wherein an exhaust manifold that conducts the combustion gas from the main combustion chamber extends in parallel to the row of head covers and on the same side of the row of head covers as the gas fuel pipe and the intake manifold, and the exhaust manifold and the intake manifold are disposed to be divided above and below the gas fuel pipe.

6. The engine device according to claim 3, wherein on one end face of the cylinder block, which is perpendicular to an engine output shaft, at one side face side, as an outer circumferential side of the engine output shaft, of the cylinder block in which the lubricant oil cooler is disposed, a lubricant oil pump is disposed and supplies the lubricant oil cooler with lubricant oil sucked up by the lubricant oil pump.

7. The engine device according to claim 3, wherein an exhaust manifold that conducts the combustion gas from the main combustion chamber extends in parallel to the row of head covers and on the same side of the row of head covers as the gas fuel pipe and the intake manifold, and the exhaust manifold and the intake manifold are disposed to be divided above and below the gas fuel pipe.

* * * * *